(12) United States Patent
Kashiyama et al.

(10) Patent No.: US 7,941,413 B2
(45) Date of Patent: May 10, 2011

(54) INDEX PROCESSING METHOD AND COMPUTER SYSTEMS

(75) Inventors: Toshihiko Kashiyama, Hachioji (JP); Itaru Nishizawa, Kaganei (JP)

(73) Assignee: Hitachi, Ltd., Tokyo (JP)

( * ) Notice: Subject to any disclaimer, the term of this patent is extended or adjusted under 35 U.S.C. 154(b) by 1047 days.

(21) Appl. No.: 11/698,932

(22) Filed: Jan. 29, 2007

(65) Prior Publication Data
US 2008/0114787 A1    May 15, 2008

(30) Foreign Application Priority Data

Nov. 15, 2006  (JP) ................................. 2006-309144

(51) Int. Cl.
*G06F 17/30* (2006.01)
(52) U.S. Cl. ....................................... 707/696; 707/797
(58) Field of Classification Search .................. 707/696, 707/797
See application file for complete search history.

(56) References Cited

U.S. PATENT DOCUMENTS

| | | | |
|---|---|---|---|
| 5,495,600 A | | 2/1996 | Terry et al. |
| 5,568,638 A | * | 10/1996 | Hayashi et al. ............... 707/613 |
| 5,644,763 A | | 7/1997 | Roy |
| 5,701,467 A | * | 12/1997 | Freeston ....................... 707/100 |
| 5,758,356 A | * | 5/1998 | Hara et al. .................... 707/683 |
| 6,175,835 B1 | * | 1/2001 | Shadmon ...................... 707/696 |
| 6,240,418 B1 | * | 5/2001 | Shadmon ...................... 707/696 |
| 6,438,562 B1 | * | 8/2002 | Gupta et al. .................. 707/696 |
| 6,594,655 B2 | * | 7/2003 | Tal et al. ....................... 707/797 |
| 6,681,218 B1 | * | 1/2004 | Zou .............................. 707/696 |
| 6,711,562 B1 | * | 3/2004 | Ross et al. ..................... 707/741 |
| 6,859,455 B1 | * | 2/2005 | Yazdani et al. ............... 370/392 |
| 6,901,396 B1 | * | 5/2005 | Taylor ........................... 707/758 |
| 7,007,027 B2 | * | 2/2006 | Najork et al. ................. 707/722 |
| 7,039,641 B2 | * | 5/2006 | Woo .............................. 370/400 |
| 2003/0033328 A1 | * | 2/2003 | Cha et al. ...................... 707/204 |
| 2006/0277230 A1 | | 12/2006 | Nishizawa et al. |

OTHER PUBLICATIONS

U.S. Appl. No. 11/359,540, filed Feb. 23, 3006, Nishizawa et al., pending.
U.S. Appl. No. 11/502,474, filed Aug. 11, 2006, Kashiyama et al., pending.
Rajeev Motwani et al., "Query Processing, Resource Management, and Approximation in a Data Stream Management System", Proceedings of the 2003 CIDR Conference, 12 pages.
C. J. Date et al., "A Guide to the SQL Standard", Fourth Edition, Addison-Wesley, Nov. 8, 1996, pp. 8-26.
Ramez Elmasri et al., "Fundamentals of Database Systems", Third Edition, Addison-Wesley, Aug. 1999, pp. 155-192.
Tobin J. Lehman et al., "A Study of Index Structures for Main Memory Database Management Systems", Proceedings of the Twelfth International Conference on Very Large Data Bases, Aug. 1986, pp. 294-303.

* cited by examiner

*Primary Examiner* — Don Wong
*Assistant Examiner* — Kim T Nguyen
(74) *Attorney, Agent, or Firm* — Stites & Harbison, PLLC; Juan Carlos A. Marquez, Esq

(57) ABSTRACT

Provided is an effective index processing method for a key corresponding to characteristics of a key series. The index processing method includes: holding a key tendency for representing the characteristics of the key series and a node split ratio, corresponding to the key tendency, for representing a key split ratio at the time of node split; and switching the node split ratio of an index (162) based on the key tendency. The key tendency/distribution is determined based on characteristic information of data input by a user or monitoring information acquired through monitoring of the data.

19 Claims, 27 Drawing Sheets

QUERY REGISTRATION COMMAND

```
register query Q1 as
ISTREAM ( SELECT TEMPERATURE SENSOR ID, Min(TEMPERATURE), Max(TEMPERATURE) FROM S1[RANGE 1 hour]
GROUP BY TEMPERATURE SENSOR ID HAVING Max(TEMPERATURE) – Min(TEMPERATURE) > 5 ) ;
```

NODE SPLIT RATIO SETTING COMMAND

```
create(alter) index INDEX 1 S1 TEMPERATURE
–splitratio {increase 5:2, decrease 2:5, random 1:1}
```

STREAM DATA CHARACTERISTIC SETTING COMMAND

```
set streamcharacteristics S1 TEMPERATURE {increase 6:00<=timestamp<13:00,
decrease 0:00<=timestamp<3:00 AND 16:00<=timestamp<0:00,
random 3:00<=timestamp<6:00 AND 13:00<=timestamp<16:00}
```

QUERY MANAGEMENT TABLE 122

| 401 | 402 | 403 | 404 | 405 |
|---|---|---|---|---|
| QUERY NAME | QUERY | QUERY EXECUTABLE FORM STORAGE DESTINATION | REGISTRANT NAME | TIME AND DATE OF REGISTRATION |
| Q1 | SELECT TEMPERATURE SENSOR ID, Min(TEMPERATURE), Max(TEMPERATURE) FROM S1[RANGE 1 hour] GROUP BY TEMPERATURE SENSOR ID HAVING Max(TEMPERATURE) – Min(TEMPERATURE) > 5 | 0x7FFFAEE1 | KASHIYAMA | 2006/08/01 13:07:26 JST |
| Q2 | SELECT HUMIDITY SENSOR ID, Max(HUMIDITY) FROM S2[Range 30 minutes] | 0x7FFFA471 | KASHIYAMA | 2006/02/02 09:46:13 JST |
| ... | ... | ... | ... | ... |

CHARACTERISTIC INFORMATION MANAGEMENT TABLE 132

| STREAM DATA NAME 501 | COLUMN NAME 502 | TIME STAMP RANGE 503 | TENDENCY 504 |
|---|---|---|---|
| S1 | TEMPERATURE | 6:00<=TIME STAMP<13:00 | INCREASE TENDENCY 505 |
| | | 0:00<=TIME STAMP<3:00 16:00<=TIME STAMP<00:00 | DECREASE TENDENCY 506 |
| | | 3:00<=TIME STAMP<6:00 13:00<=TIME STAMP<16:00 | RANDOM TENDENCY 507 |
| S2 | HUMIDITY | — | RANDOM TENDENCY |
| S3 | TEMPERATURE | — | INCREASE TENDENCY · DECREASE TENDENCY · RANDOM TENDENCY 508 |
| S4 | PRODUCT ID | — | MONOTONIC INCREASE TENDENCY |
| S5 | PRODUCT ID | — | MONOTONIC DECREASE TENDENCY |
| S6 | PRODUCT ID | — | DIVERGING TENDENCY · CONVERGING TENDENCY |
| ... | ... | ... | ... |

FIG. 8

INDEX MANAGEMENT TABLE 151

| INDEX NAME 701 | STREAM DATA NAME 702 | COLUMN NAME 703 | KEY TENDENCY 704 | NODE TYPE 705 | SPLIT RATIO 706 |
|---|---|---|---|---|---|
| INDEX 1 | S1 | TEMPERATURE | INCREASE TENDENCY | — | 5:2 707 |
|  |  |  | DECREASE TENDENCY | — | 2:5 708 |
|  |  |  | RANDOM TENDENCY | — | 1:1(3:4) 709 |
| INDEX 2 | S2 | HUMIDITY | INCREASE TENDENCY | LEAF NODE | 5:2 710 |
|  |  |  | DECREASE TENDENCY | INDEX NODE | 4:2 711 |
|  |  |  | MONOTONIC INCREASE TENDENCY | LEAF NODE | 2:5 |
|  |  |  | MONOTONIC DECREASE TENDENCY | INDEX NODE | 2:4 |
|  |  |  | DIVERGING TENDENCY | — | 6:1 |
|  |  |  | CONVERGING TENDENCY | — | 1:6 |
|  |  |  |  | — | LEFT 2:5 MIDDLE 1:1 RIGHT 5:2  712 |
|  |  |  |  | — | LEFT 5:2 MIDDLE 1:1 RIGHT 2:5  713 |
|  |  |  | RANDOM TENDENCY | — | 1:1 |
| ... | ... | ... | ... | ... | ... |

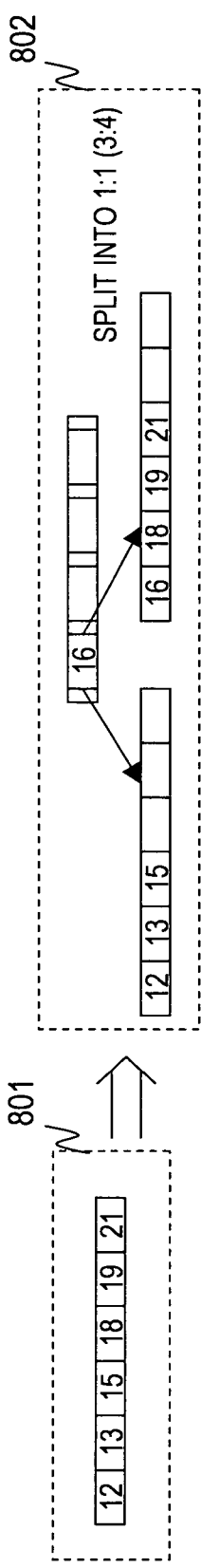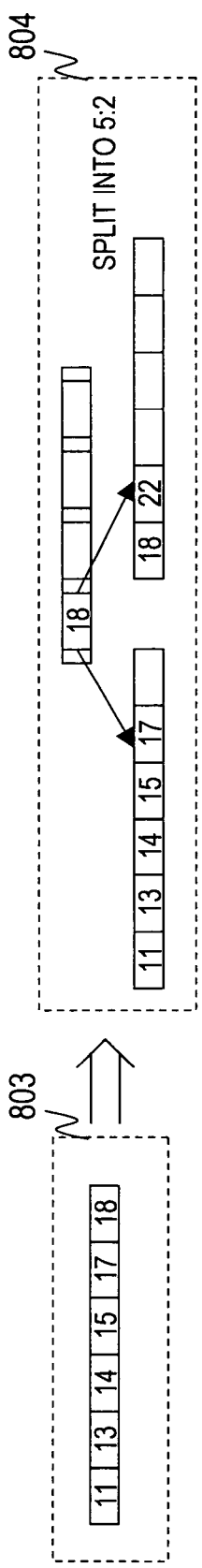

(c) DECREASE TENDENCY: INSERT IN ORDER OF (22, 18, 15, 17, 14, 13, 11)

PUBLICLY KNOWN EXAMPLE (SPLIT AT INSERTION POSITION): INSERT IN ORDER OF (11, 13, 14, 17, 15, 18, 22, 21)

OUTPUT RESULT 180

| TIME STAMP | TEMPERATURE SENSOR ID | Min (TEMPERATURE) | Max (TEMPERATURE) |
|---|---|---|---|
| 10:00 | 101 | 12.5 | 18.0 |
| 10:01 | 101 | 12.5 | 18.3 |
| 10:01 | 110 | 14.3 | 19.4 |
| ... | ... | ... | ... |
| 10:10 | 101 | 13.1 | 18.8 |
| 10:10 | 102 | 15.7 | 20.9 |

FIG. 12

MONITORING INFORMATION MANAGEMENT TABLE 143

| TIME STAMP (601) | STREAM DATA NAME (602) | COLUMN NAME (603) | ATTRIBUTE VALUE (604) | DATA RATE (605) | STATISTICAL VALUE (606) | PRESENT VALUE (607) | INCREMENT COUNTER (608) | DECREMENT COUNTER (609) | TENDENCY PREDICTION (610) |
|---|---|---|---|---|---|---|---|---|---|
| 10:00 | S1 | TEMPERATURE | TEMPERATURE SENSOR ID=101 | 30 TUPLE/MINUTE | AVERAGE =17.5 °C | 18.0 | 50 | 4 | INCREASE TENDENCY (611) |
|  |  |  | TEMPERATURE SENSOR ID=102 | 12 TUPLE/MINUTE | AVERAGE =20.3 °C | 20.5 | 15 | 25 | DECREASE TENDENCY (612) |
|  | S2 | HUMIDITY | — | 5 TUPLE/MINUTE | CENTER VALUE =63% | 60 | 1 | 24 | DECREASE TENDENCY (613) |
| 10:05 | S1 | TEMPERATURE | TEMPERATURE SENSOR ID=101 | 30 TUPLE/MINUTE | AVERAGE =18.3 °C | 18.5 | 46 | 7 | INCREASE TENDENCY |
|  |  |  | TEMPERATURE SENSOR ID=102 | 12 TUPLE/MINUTE | AVERAGE =20.6 °C | 20.7 | 18 | 22 | RANDOM TENDENCY (614) |
|  | S2 | HUMIDITY | — | 5 TUPLE/MINUTE | CENTER VALUE =59 % | 57 | 2 | 23 | DECREASE TENDENCY |
| 10:10 | S1 | TEMPERATURE | TEMPERATURE SENSOR ID=101 | 28 TUPLE/MINUTE | AVERAGE =18.6 °C | 18.8 | 43 | 9 | INCREASE TENDENCY |
|  |  |  | TEMPERATURE SENSOR ID=102 | 12 TUPLE/MINUTE | AVERAGE =20.8 °C | 20.9 | 24 | 13 | INCREASE TENDENCY |
|  | S2 | HUMIDITY | — | 5 TUPLE/MINUTE | CENTER VALUE =56 % | 55 | 0 | 25 | DECREASE TENDENCY |
| ... | ... | ... | ... | ... | ... | ... | ... | ... | ... |

*FIG. 13*

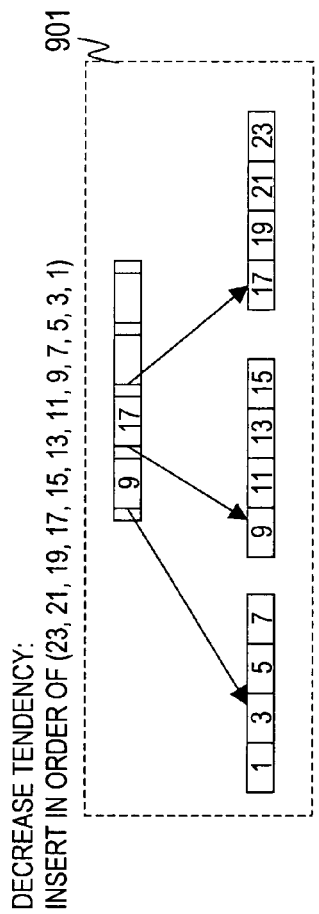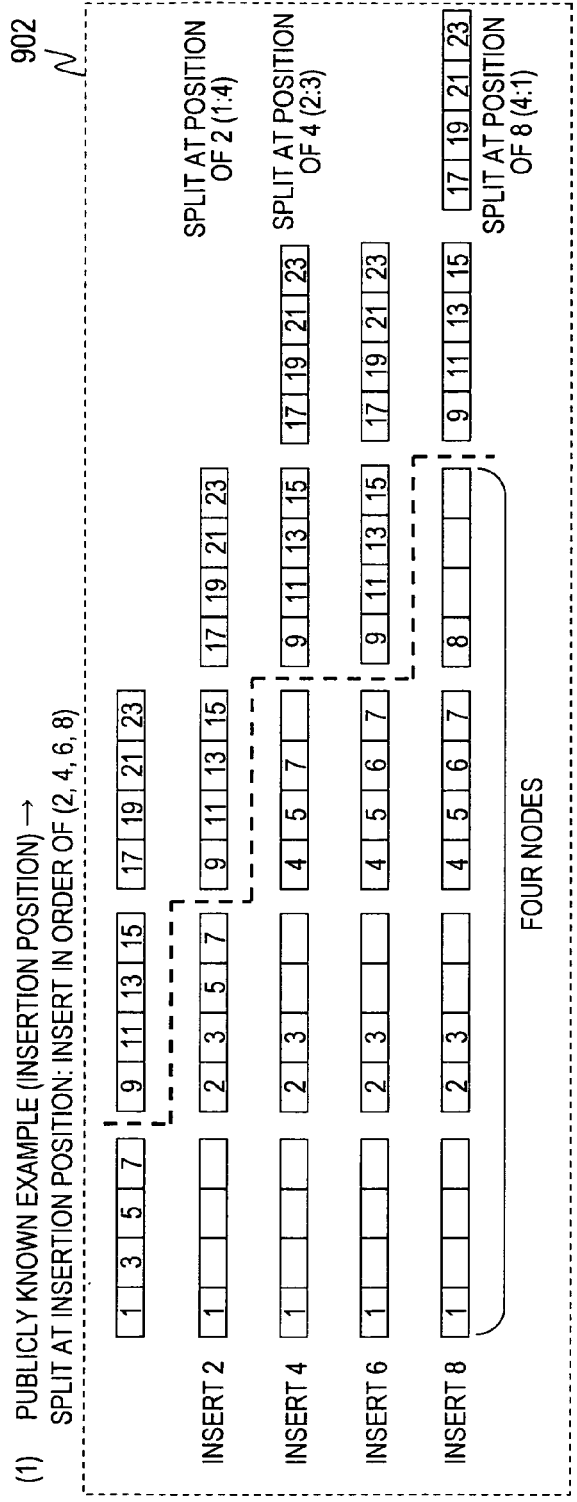

INDEX MONITORING INFORMATION MANAGEMENT TABLE 154

| TIME STAMP 1001 | INDEX NAME 1002 | STREAM DATA NAME 1003 | COLUMN NAME 1004 | ATTRIBUTE VALUE 1005 | FILL FACTOR 1006 | NODE SPLIT NUMBER 1007 | NODE SPLIT RATIO 1008 |
|---|---|---|---|---|---|---|---|
| 2006/08/01 10:00:00 JST | INDEX 1 | S1 | TEMPERATURE | TEMPERATURE SENSOR ID = 101 | 80% | 6 | 3:1 |
|  |  |  |  | TEMPERATURE SENSOR ID = 102 | 74% | 2 | 3:1 |
|  | INDEX 2 | S2 | HUMIDITY | — | 90% | 0 | 2:5 |
| 2006/08/01 10:05:00 JST | INDEX 1 | S1 | TEMPERATURE | TEMPERATURE SENSOR ID = 101 | 78% | 7 | 3:1 |
|  |  |  |  | TEMPERATURE SENSOR ID = 102 | 70% | 5 | 3:1 |
|  | INDEX 2 | S2 | HUMIDITY | — | 90% | 2 | 2:5 |
| 2006/08/01 10:10:00 JST | INDEX 1 | S1 | TEMPERATURE | TEMPERATURE SENSOR ID = 101 | 76% | 18 | 1:3 |
|  |  |  |  | TEMPERATURE SENSOR ID = 102 | 64% | 7 | 1:3 |
|  | INDEX 2 | S2 | HUMIDITY | — | 90% | 3 | 2:5 |
| ... | ... | ... | ... | ... | ... | ... | ... |

INDEX MANAGEMENT TABLE 151

| INDEX NAME 1501 | STREAM DATA NAME 1502 | COLUMN NAME 1503 | KEY TENDENCY 1504 | LEAF NODE POSITION 1505 | SPLIT RATIO 1506 |
|---|---|---|---|---|---|
| INDEX 1 | S1 | TEMPERATURE | INCREASE TENDENCY | 0<=POSITION<10 | 4:3 |
| | | | | 10<=POSITION<90 | 5:2 |
| | | | | 90<=POSITION<100 | 6:1 |
| | | | DECREASE TENDENCY | 0<=POSITION<10 | 1:6 |
| | | | | 10<=POSITION<90 | 2:5 |
| | | | | 90<=POSITION<100 | 3:4 |
| | | | RANDOM TENDENCY | — | 1:1(3:4) |
| ... | ... | ... | ... | ... | ... |

1507
1508
1509

INDEX PROCESSING METHOD AND COMPUTER SYSTEMS

CLAIM OF PRIORITY

The present application claims priority from Japanese application JP 2006-309144 filed on Nov. 15, 2006, the content of which is hereby incorporated by reference into this application.

BACKGROUND OF THE INVENTION

This invention relates to an index construction method for data such as real time stream data, which is frequently inserted and deleted, particularly for data for which an index key value presents an increase/decrease tendency with fluctuation, and data for which a key tendency is switched.

There has been an increasing demand for a data processing system which carries out real-time processing for data continuously arriving at a database management system (hereinafter referred to as DBMS), which carries out processes for data stored in the storage system. For example, in a system for trading stocks, how fast the system can react to changes in stock prices is one of the most important objects, and a method such as the one carried out by a conventional DBMS, in which stock data is once stored in a storage system, and then the stored data is searched for, cannot immediately respond in correspondence with the speed of the changes in stock prices, and may result in losing business chances. For example, though U.S. Pat. No. 5,495,600 discloses a mechanism which issues stored queries periodically, it is difficult to apply this mechanism to the real time data processing for which it is important to execute a query immediately after data such as stock prices is input.

Data which continuously arrives is defined as stream data, and there has been proposed a stream data processing system as a data processing system preferable for the real-time processing for the stream data. For example, R. Motwani, J. Widom, A. Arasu, B. Babcock, S. Babu, M. Datar, G. Manku, C. Olston, J. Rosenstein, and R. Varma: "Query Processing, Resource Management, and Approximation in a Data Stream Management System", In Proc. of the 2003 Conf. on Innovative Data Systems Research (CIDR), (online), January 2003, (retrieved on Oct. 12, 2006), Internet URL <http://infolab.usc.edu/csci599/Fall2002/paper/DS1_datastreammanagem entsystem.pdf> discloses a stream data processing system "STREAM".

In the stream data processing system, first, queries are registered to the system, and the queries are executed continuously when data arrives, which is different from the conventional DBMS. The above-mentioned STREAM employs an idea referred to as sliding window, which partially cut stream data for efficiently processing the stream data. As a preferred example of a query description language including a sliding window specification, there is a continuous query language (CQL) disclosed in R. Motwani, J. Widom, A. Arasu, B. Babcock, S. Babu, M. Datar, G. Manku, C. Olston, J. Rosenstein, and R. Varma: "Query Processing, Resource Management, and Approximation in a Data Stream Management System", In Proc. of the 2003 Conf. on Innovative Data Systems Research (CIDR), (online), January 2003, (retrieved on Oct. 12, 2006), Internet URL <http://infolab.usc.edu/csci599/Fall2002/paper/DS1_datastreammanagem entsystem.pdf>. The CQL includes an extension for specifying the sliding window by using parentheses following a stream name in a FROM close of a structured query language (SQL), which is widely used for the DBMS. As for SQL, there is a known one disclosed in C. J. Date, Hugh Darwen: "A Guide to SQL Standard (4th Edition)", the United States, Addison-Wesley Professional, Nov. 8, 1996, ISBN: 0201964260. There are two types of typical methods for specifying the sliding window: (1) a method of specifying the number of data rows to be cut, and (2) a method of specifying a time period containing data rows to be cut. For example, "Rows 50 Preceding" described in a second paragraph of R. Motwani, J. Widom, A. Arasu, B. Babcock, S. Babu, M. Datar, G. Manku, C. Olston, J. Rosenstein, and R. Varma: "Query Processing, Resource Management, and Approximation in a Data Stream Management System", In Proc. of the 2003 Conf. on Innovative Data Systems Research (CIDR), (online), January 2003, (retrieved on Oct. 12, 2006), Internet URL <http://infolab.usc.edu/csci599/Fall2002/paper/DS1_datastreammanagem entsystem.pdf> is a preferred example of the item (1), in which data corresponding to 50 rows is cut to be processed, and "Range 15 Minutes Preceding" is a preferred example of the item (2), in which data for 15 minutes is cut to be processed. The stream data cut by the sliding window is retained on a memory, and is used for the query processing.

To accelerate processing, the conventional DBMS constructs an index such as a B-tree index. As the B-tree index, one disclosed in R. Elmasri, S. B. Navathe: "Fundamentals of Database Systems, 3rd edition, the United States, Addison-Wesley Professional, August, 1999, ISBN: 0805317554 is known. If keys whose value monotonically increases are inserted into the B-tree index, a node is split in order to halve the number of the keys, and there thus arises a problem in that a half of an area for index is not used. To solve this problem, there has been proposed a method to efficiently construct an index for monotonically increasing data by unevenly splitting a node at a key insertion position. A technique to split a node at a key insertion position is disclosed in U.S. Pat. No. 5,644,763.

The application of the stream data processing system is expected in fields in which the real time processing is required, and is typified by financial applications, traffic information systems, traceability systems, sensor monitoring systems, and computer system management.

SUMMARY OF THE INVENTION

Though it is necessary to build an index to accelerate the stream data processing or database processing, there arises a problem in terms of performance if the node split occurs frequently for data continuously inserted/deleted. The amount of the memory used to construct the index runs short, and, thus rebuilding of the index becomes necessary, resulting in problems in that the real time processing becomes impossible, the stream data processing stops, and the like. Thus, it is necessary to reduce the maintenance cost of the index by reducing the number of splits of the nodes of the index, or reducing the processing cost for the node split. A method of splitting a node in an unbalanced manner at a position to insert a key into a B-tree index has conventionally been disclosed to build an index with a small capacity for monotonically increasing data. However, there are following problems for the index processing method of splitting a node at a key insertion position.

(1) Though sensor monitoring data such as temperature data keeps rising for a certain period, and again keeps rising after falling once, for example, thus tends to generally increase, but does not monotonically increase. Moreover, though an ID for a product, for example, is set to increase one by one, when the ID's are processed, the ID does not always increase one by one, but the ID's may be switched. If the index processing method of splitting a node at a key insertion position is applied to data which generally increases or decreases with fluctuations as described above, data during a fluctuation may cause further node splits, resulting in a problem of an increase of the capacity of an index.

(2) Sensor monitoring data such as temperature data may present a periodical change such as a continuous increase followed by a fall, and the air temperature rises from night to day, and falls from day to night. In other words, a tendency of data switches according to time. If the index processing method of splitting a node at a key insertion position is applied to data which presents switches of a tendency, there is a problem in that the node split frequently occurs at a switch of the tendency, resulting in a problem of an increased index capacity.

This invention has been made in view of the above-mentioned problems. It is therefore an object of this invention to provide an index which is small in capacity, and enables high-speed processing for data presenting not a monotonic increase or decrease but fluctuations in key values. It is another object of this invention to provide an index which is small in capacity, and enables high-speed processing for data presenting an increase tendency and a decrease tendency in turn.

In order to achieve the objects, this invention changes a split ratio of a node, which represents a key distribution ratio when a node is split, based on a tendency of index keys. The node split ratio is determined by a predetermined value or a calculated value. A key tendency/distribution is determined by (1) characteristic information of stream data represented by a combination of time of input by a user, and a key tendency, and (2) monitoring information acquired by monitoring stream data.

It is another object of this invention to provide (1) means for determining a node split ratio using a node position representing the position of a node in the entire index, (2) means for dynamically changing a node split ratio based on a key tendency and a key insertion position, and (3) means for determining a node split ratio using split history information maintaining previous node split ratios are provided.

It is a further object of this invention to provide means for detecting a frequent node split based on data rate information acquired by monitoring the stream data, and split number information acquired by monitoring the index in order to detect the calculated key tendency is different from an actual key tendency.

It is possible to realize an index which is small in capacity, and enables high-speed processing by applying this invention. Consequently, it is possible to realize stream data processing and database processing which enables a high-speed search.

BRIEF DESCRIPTION OF THE DRAWINGS

FIG. 5A describes a description example of a preferable command when a query is registered to the stream data processing system 100.

FIG. 5B describes a description example of a preferable command when a node split ratio is set to the stream data processing system 100.

FIG. 5C describes a description example of a preferable command when characteristic information of stream data is set to the stream data processing system 100.

FIG. 6 shows a configuration example of a query management table 122.

FIG. 7 shows a configuration example of a characteristic information management table 132.

FIG. 8 shows a configuration example of an index management table 151.

FIG. 10A describes an example of a node split of an index upon a random tendency.

FIG. 10B describes an example of a node split of an index upon an increase tendency.

FIG. 12 describes an example of an output result 180.

FIG. 13 shows a second embodiment, and shows a configuration example of a monitoring information management table 143.

FIG. 16A shows the third embodiment, and describes assumption for an example of calculating a node split ratio according to a key tendency and a key insertion position, and splitting a node.

FIG. 16B shows the third embodiment, and describes an example of an index in an index processing method which splits a node at an insertion position.

FIG. 17 shows a fourth embodiment, and shows a configuration example of an index monitoring information management table 154.

FIG. 23 shows anther configuration example of an index management table.

DETAILED DESCRIPTION OF THE PREFERRED EMBODIMENTS

A description will now be given of embodiments of this invention.

Figure 1:
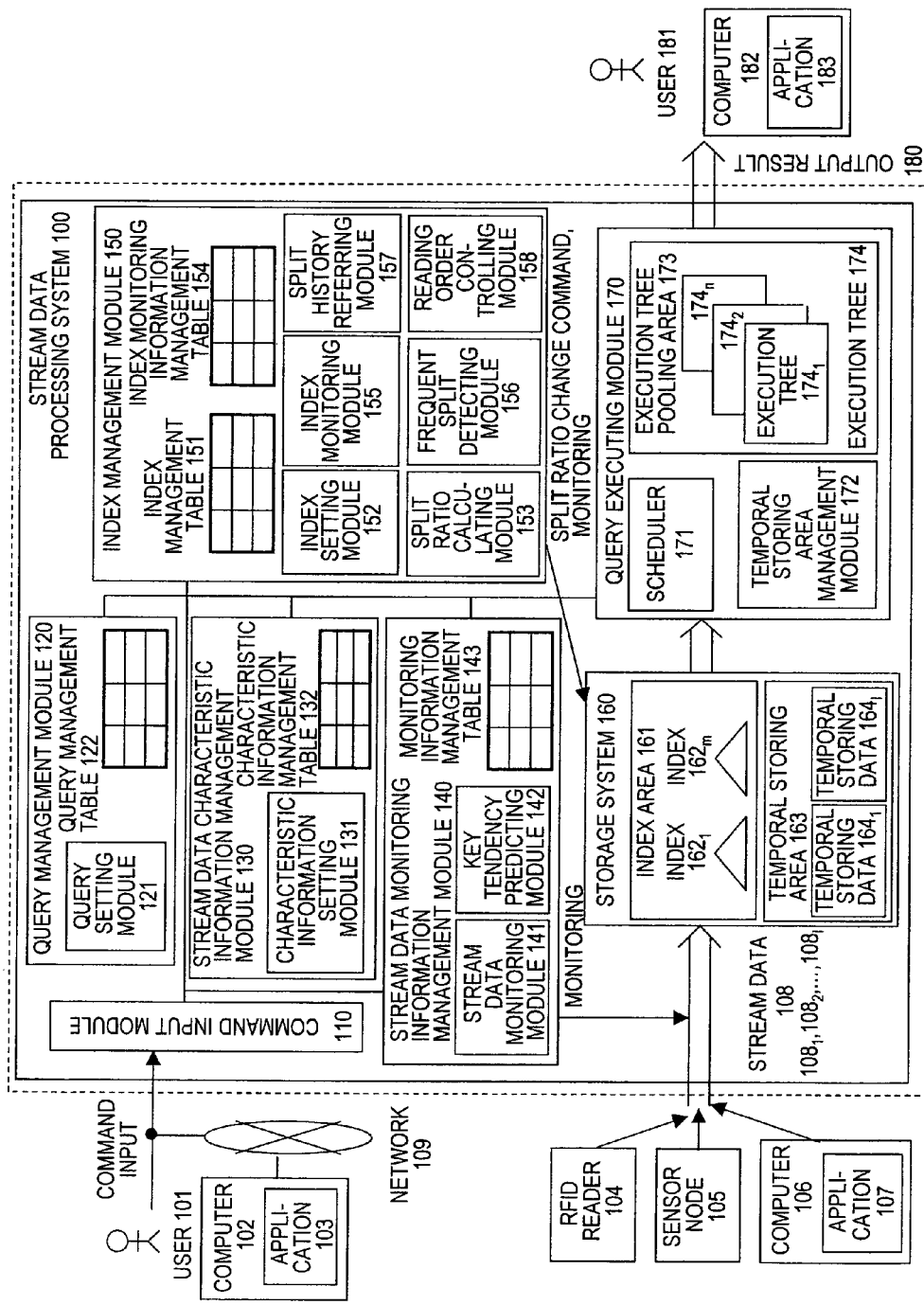
FIG. 1 is a block diagram showing a configuration of a stream data processing system according to a first embodiment of this invention, and relating systems.

FIG. 1 is a block diagram showing a configuration of a stream data processing system according to an embodiment of this invention, and relating systems.

In FIG. 1, the stream data processing system 100 is a computer or a server which receives information, which is transmitted in real time from an RFID reader 104, a sensor node 105, or an application 107 running on a computer 106, as stream data 108, based on a command input by a user 101 or an application 103 running on a computer 102, converts the input stream data 108 into significant information, produces an output result 180, and supplies a user 181 or an application 183 running on a computer 182 with the output result 180. The stream data includes multiple stream data $108_1$, $108_2$, ..., $108_1$.

The computer 102 is connected to the stream data processing system 100 via a network 109. The network 109 may be a local area network (LAN) constructed by connecting an Ethernet®, an optical fiber, a fiber distributed data interface (FDDI), and the like or a wide area network (WAN) which includes the Internet, which is slower in speed than the LAN.

In this case, the stream data processing system 100, and the computers 102, 106, and 182 may be any computers such as personal computers and workstations, and may be the same computer or different computers. Moreover, the applications 103, 107, and 183 may be the same application or different applications. Moreover, the users 101 and 181 may be the same user or different users.

In this case, the stream data 108 processed in this embodiment is different from a stream used to distribute video or audio, and one stream data corresponds to significant information. Moreover, the stream data 108 received from the RFID reader 104, the sensor node 105, or the application 107 running on the computer 106 by the stream data processing system 100 is continuous or intermittent, and respective stream data includes different product information and different items.

The stream data processing system 100 includes a command input module 110, a query management module 120, a stream data characteristic information management module 130, a stream data monitoring information management module 140, an index management module 150, a storage system 160, and a query executing module 170.

The command input module 110 receives a command input by the user 101 or the application 103 running on the computer 102. Then, the query management module 120 manages a query indicating a process which is received by the command input module 110, and converts the stream data into significant information. Then, the stream data characteristic information management module 130 manages characteristic information of stream data representing characteristics of attribute values of the stream data such as a tendency and a distribution of the attribute values of the stream data received by the command input module 110.

Then, the stream data monitoring information management module 140 monitors the stream data 108 input to the stream data processing system 100, and acquires and manages monitoring information representing information relating to stream data such as statistical information of the stream data 108. Then, the index management module 150 manages index information representing information relating to indexes such as node split ratio representing a key distribution ratio when a node of the index 162 is split in the storage system 160.

Then, the storage system 160 stores the stream data 108 and indexes for the stream data 108. The storage system 160 may be any recording medium such as a memory, a disk, a tape, and a flash memory. Moreover, the storage system 160 may have a hierarchical structure including multiple recording media. The query executing module 170 converts the information on the stream data 108 stored in the storage system 160 into significant data, and output the significant data.

Figure 2:
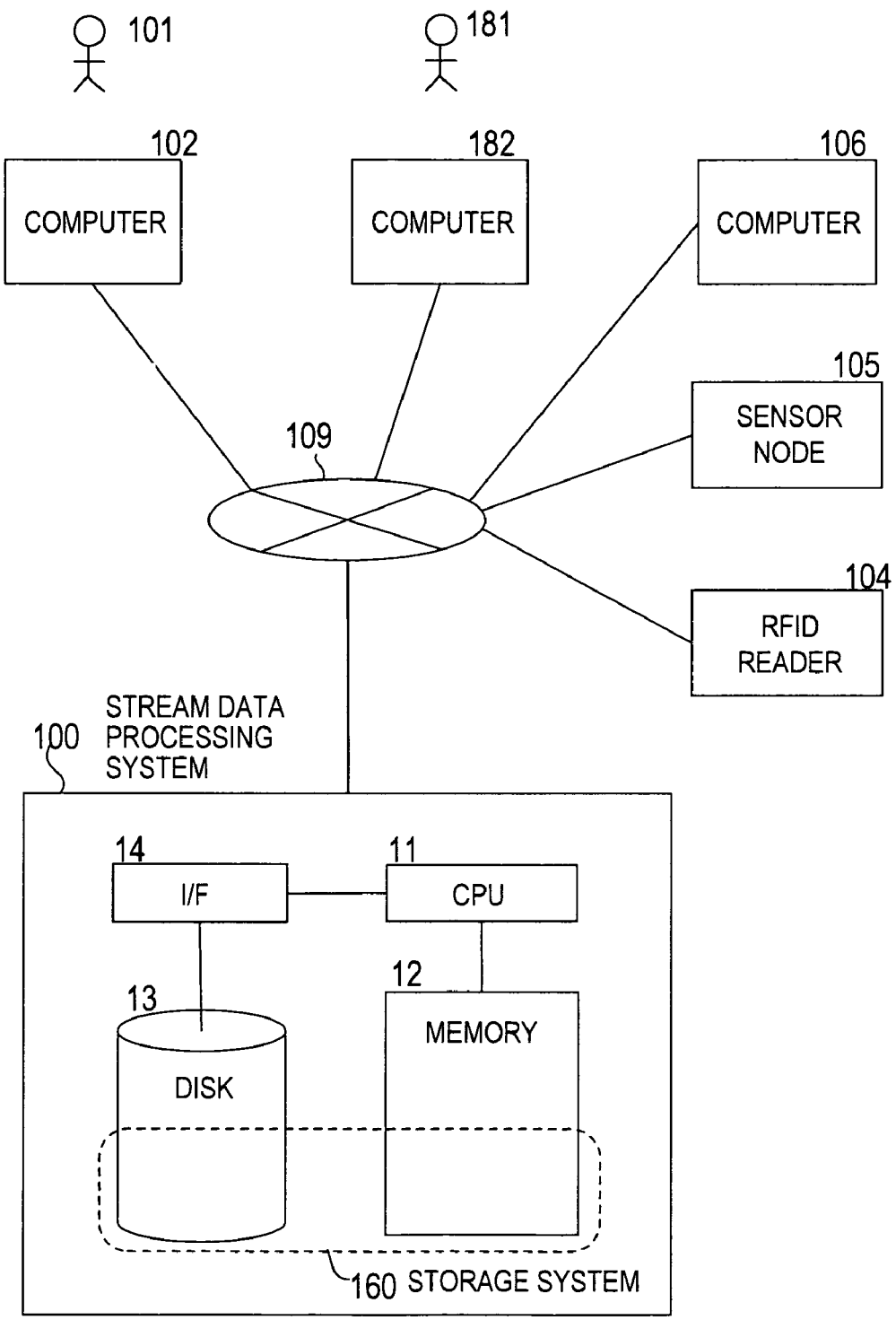
FIG. 2 is a block diagram showing an example of a computer system according to this invention.

FIG. 2 shows a hardware environment of the stream data processing system 100. The stream data processing system 100 is executed on one computer, and includes a CPU 11 for executing arithmetic operations, a memory 12 for storing the stream data 108 and programs for the stream data processing, a disk device 13 for storing data, and an interface 14 for connecting the CPU 11 with the disk device 13 and the network 109. The programs may be stored on a computer-readable medium. The computer-readable medium includes a memory and a disk.

The computer 102 for inputting commands to the stream data processing system 100, and the computer 182 for using the output results 180 output by the stream data processing system 100 are connected to the network 109.

Moreover, the computer 106 for outputting the stream data 108, the sensor node 105, and the radio frequency identification (RFID) reader 104 are connected to the network 109. For example, the computer 106 outputs product numbers and the like, the sensor node 105 outputs results of measuring an environment (such as temperature), and the RFID 104 outputs information on a read RFID tag. These outputs as the stream data 108 are input to the stream data processing system 100.

In this case, the storage system 160 shown in FIG. 1 includes a predetermined area of the memory 12 and a predetermined area of the disk device 13. The stream data 108 along with indexes is stored mainly in the storage system 160 on the memory 12 in order to realize a high-speed search upon a query. For the ever-changing stream data 108, data to be searched for may be stored on the storage system 160 on the memory 12, and data which were used for search may be stored on the storage system 160 on the disk device 13. For example, if the stream data 108 are measured values (such as temperatures) from the sensor node 105, the user 181 wants to monitor measured data of today, and even if the data of yesterday and days before cannot be searched at a high speed, there arises no problem. Thus the measured values for today may be stored on the memory 12, and the measured values for yesterday and before may be stored on the disk device 13.

With reference to FIG. 1, a brief description will be given of this invention. The stream data processing system 100 converts input stream data 108 into significant information based on a query input by the user 101 or the application 103 running on the computer 102. In this case, the significant information represents values measured by the sensor node 105, which are binaries, and are not intelligible to the users 101 and 181, and therefore converted into values in a predetermined unit system, for example.

Then, in order to accelerate the search process carried out on the stream data, the stream data processing system 100 prepares an index 162 for the stream data 108, and the query executing module 170 reads out the stream data 108 via the index 162. In this case, the user 101 or the application 103 running on the computer 102 inputs the tendency of the values of index keys of the index 162, and the distribution of the values of the index keys to the stream data characteristic information management module 130, and inputs the node split ratio for the index into the index management module 150. Moreover, the index 162 changes the node split ratio of the index 162 based on the tendency of the index keys of the stream data 108. As a result, an area required for the index is minimized, and simultaneously, the stream data 108 can be processed at a high speed.

A detailed description will be given of the configuration of the stream data processing system 100.

The command input module 110 includes an interface (hereinafter referred to as I/F) for receiving a command input by the user 101 or the application 103 running on the computer 102. If the command is a command relating to a query, the command input module 110 outputs a command content to the query management module 120. Moreover, if the command is a command relating to characteristic information of the stream data 108, the command input module 110 outputs the command content to the stream data characteristic management module 130. Moreover, if the command is a command relating to monitoring information on the stream data, the command input module 110 outputs the command content to the stream data monitoring information management module 140, and if the command is a command relating to the index, the command input module 110 outputs the command content to the index management module 150.

The query management module 120 includes a query setting module 121 and a query management table 122. The query setting module 121 receives a query registration/change command, which registers or changes a query input from the command input module 110, and updates the query management table 122. Moreover, the query setting module 121 produces/changes an execution tree 174 representing contents for processing stream data, which corresponds to the query command. It should be noted that the query setting module 121 transmits the produced execution tree 174 to the query executing module 170, and causes the query executing module 170 to store the produced execution tree 174. The query management table 122 is a table for storing information set by the query setting module 121 as described later.

The stream data characteristic information management module 130 includes a characteristic information setting module 131, and a characteristic information management table 132.

The characteristic information setting module 131 receives a characteristic information setting command, which is input from the command input module 110, and sets or changes characteristic information of the stream data, and updates the characteristic information management table 132. The characteristic information management table 132 is a table which retains the information set by the characteristic information setting module 131.

The stream data monitoring information management module 140 includes a stream data monitoring module 141, a key tendency predicting module 142, and a monitoring information management table 143.

The stream data monitoring module 141 refers to the query management table 122, and monitors stream data 108, which needs to be monitored. If the stream data monitoring module 141 acquires monitoring information as a result of the monitoring, the stream data monitoring module 141 updates the monitoring information management table 143.

The stream data 108 to be monitored may not be limited to necessary ones, and may be all stream data. The key tendency predicting module 142 refers to the monitoring information management table 143, predicts a key tendency of the index based on the monitoring information on the stream data 108, and updates the monitoring information management table 143. The monitoring information management table 143 is a table which retains the monitoring information acquired by the stream data monitoring module 141 and the key tendency predicted by the key tendency predicting module 142.

The index management module 150 includes an index management table 151, an index setting module 152, a split ratio calculating module 153, an index monitoring information management table 154, an index monitoring module 155, a frequent split detecting module 156, a split history referring module 157, and a reading order controlling module 158.

The index setting module 152 receives a node split ratio setting command, which is input from the command input module 110, and sets or changes the node split ratio, and updates the index management table 151. Moreover, the index setting module 152 refers to the index management table 151, and, if the node split ratio of an index 162 changes, the index setting module 152 outputs a split ratio change command to the index 162. The index management table 151 is a table which retains the index information set by the index setting module 152.

The split ratio calculating module 153 calculates the node split ratio as described later based on the key tendency and a key insertion position in the index 162. As a result, the key tendency and the node split ratio do not corresponds to each other one by one, and, thus, the node split ratio is dynamically determined.

The index monitoring module 155 refers to the query management table 122 and the characteristic information management table 132, and monitors index 162 to be monitored. If the index monitoring module 155 acquires index monitoring information as a result of the monitoring, the index monitoring module 155 updates the index monitoring information management table 154. The index monitoring information management table 154 is a table which retains the index monitoring information acquired by the index monitoring module 155, and is configured as shown in FIG. 17 as described later. It should be noted that the index monitoring module 155 monitors the index 162 at a predetermined interval such as five minutes, and acquires the information on the index 162 subject to the monitoring. The index 162 to be monitored includes an index 162 corresponding to data (stream data 108) to which reference is set in the query management table 122, and an index 162 corresponding to data in a column name column 502 set in the characteristic information management table 132.

Figure 18:
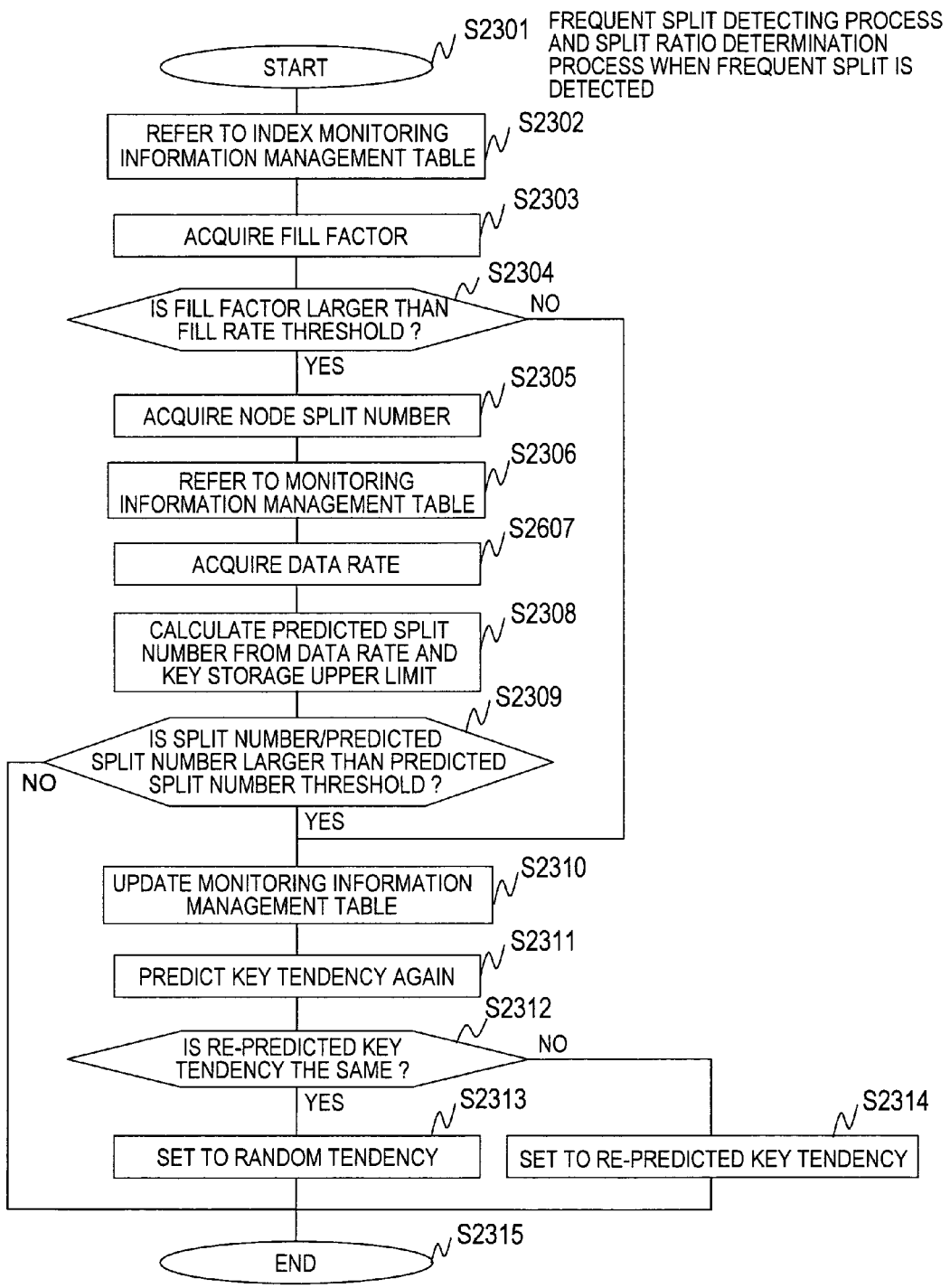
FIG. 18 shows the fourth embodiment, and is a flowchart showing processing steps of a split ratio determination process upon detecting a frequent split or upon a frequent split.

The frequent split detecting module 156 refers to the index monitoring information management table 154, and determines whether the node split is frequently occurring. The frequent split detecting module 156 determines that a frequent node split occurs if a node split number 1007 of the index monitoring information management table 154 exceeds a predetermined threshold. Then, if the frequent split detecting module 156 determines that the node split is frequently occurring, the frequent split detecting module 156 outputs a split ratio change command to the index setting module 152. If the index setting module 152 receives the split ratio changing command, as shown in FIG. 18 described later, the index setting module 152 executes a process to predict again the key tendency of the index of the storage system 160, and the like.

The split history referring module 157 refers to the index monitoring information management table 154, and determines the node split ratio, which the frequent split detecting module 156 instructs the index setting module 152, based on the split history information represented by a time stamp 1001, which is time information, and the node split ratio 1008.

The reading order controlling module 158 includes a reading order flag, which indicates whether the index setting module 152 allocates the keys of the index 162 to respective addresses of a page in a forward order or a reverse order, and carries out read/write control for the index 162 based on the reading order flag. Moreover, if a node split occurs, the reading order controlling module 158 sets the reading order flag based on the key tendency. It should be noted that a page is a collection of temporal storing data 164 to be stored in a temporal storing area 163.

The storage system 160 includes an index area 161 and a temporal storing area 163. The index area 161 is an area for storing the indexes 162, and the indexes 162 include index $162_1, 162_2, \ldots, 162_m$. The temporal storing area 163 is an area for storing the temporal storing data 164, and the temporal storing data 164 include temporal storing data $164_1, 164_2, \ldots, 164_l$.

In this case, the temporal storing data 164 is the temporally stored stream data 108. Moreover, intermediate results of executing the query and results of executing the query (if the results are used for other queries) are also stored as temporal storing data 164. The temporal storing data 164, which are no longer used, may be discarded, or may be stored in an external storage system such as the disk device 13.

Moreover, the index 162 is provided for reading the temporal storing data 164 at a high speed. If the query executing module 170 searches the index 162 by means of an index key, data or data address which matches the index key is returned. As the index processing method, one disclosed in detail in the above-mentioned R. Elmasri, S. B. Navathe: "Fundamentals of Database Systems, 3rd edition, the United States, Addison-Wesley Professional, August, 1999, ISBN: 0805317554 is known. The index includes B-tree Index, B+-tree Index, Hash Index, T-tree Index and the like. The above-described index is disclosed in T. J. Lehman and M. J. Carey, A study of index structures for main memory database management systems. In Proc. of the Int'l Conf. on Very Large Databases, pages 294-303, (online), August, 1986, (retrieved on Oct. 12, 2006), Internet URL <http://www.sigmod.org/vldb/conf/1986/P294.PDF>.

This invention is intended for an index configured as a multi-way tree where a node is split if an index key is inserted, and the number of keys exceeds an upper limit of storable keys on a node of index. It should be noted that the upper limit of the storable keys on a node is a predetermined value.

The query executing module 170 includes a scheduler 171, a temporal storing area management module 172, and an execution tree pooling area 173. The execution tree pooling area 173 includes execution trees 174, and the execution tree 174 includes multiple execution trees $174_1, 174_2, \ldots, 174_n$.

The execution tree 174 represents a content of the stream data 108, and includes process modules of filter selection operations, projection operations, join operations, aggregation operations, and the like structured as a tree. The execution tree 174 is produced by the query setting module 121. The execution tree pooling area 173 is an area for storing the execution trees 174. The scheduler 171 controls an order to execute the execution trees 174. The temporal storing area management module 172 manages production and disposal of the temporal storing data 164 stored in the storage system 160.

The temporal storing data 164 stored in the temporal storing area 163 may have any data format such as tuple (record), XML, and CSV file. A description will be given of an example employing the tuple format in the following section.

According to the first embodiment, in FIG. 1, the stream data monitoring information management module 140 (stream data monitoring module 141, key tendency predicting module 142, and monitoring information management table 143) and the split ratio calculating module 153, the index monitoring information management table 154, the index monitoring module 155, the frequent split detecting module 156, the split history referring module 157, and the reading order controlling module 158 of the index management module 150 are not used.

Figure 3:
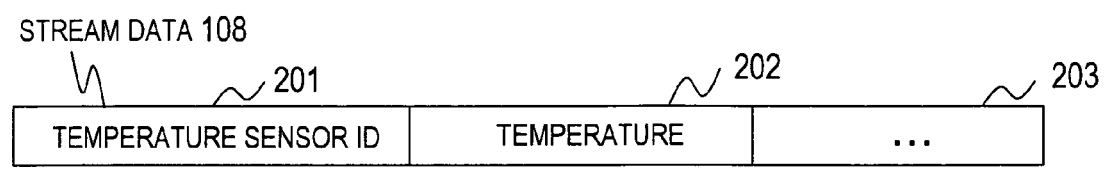
FIG. 3 schematically shows an example of a preferable data format of stream data 108.

FIG. 3 schematically shows an example of a preferable data format of the stream data 108. The illustrated example shows data output from the sensor node 105.

The stream data 108 has a record format, and a temperature sensor ID column 201 and a temperature column 202 configuring the record correspond to segments, and a combination of the temperature sensor ID column 201 and the temperature column 202 forms a tuple 203. When the stream data 108 is input into the stream data processing system 100, the time stamp representing time of arrival is added to the stream data 108. It should be noted that the time stamp may be added by a stream data source.

Figure 4:
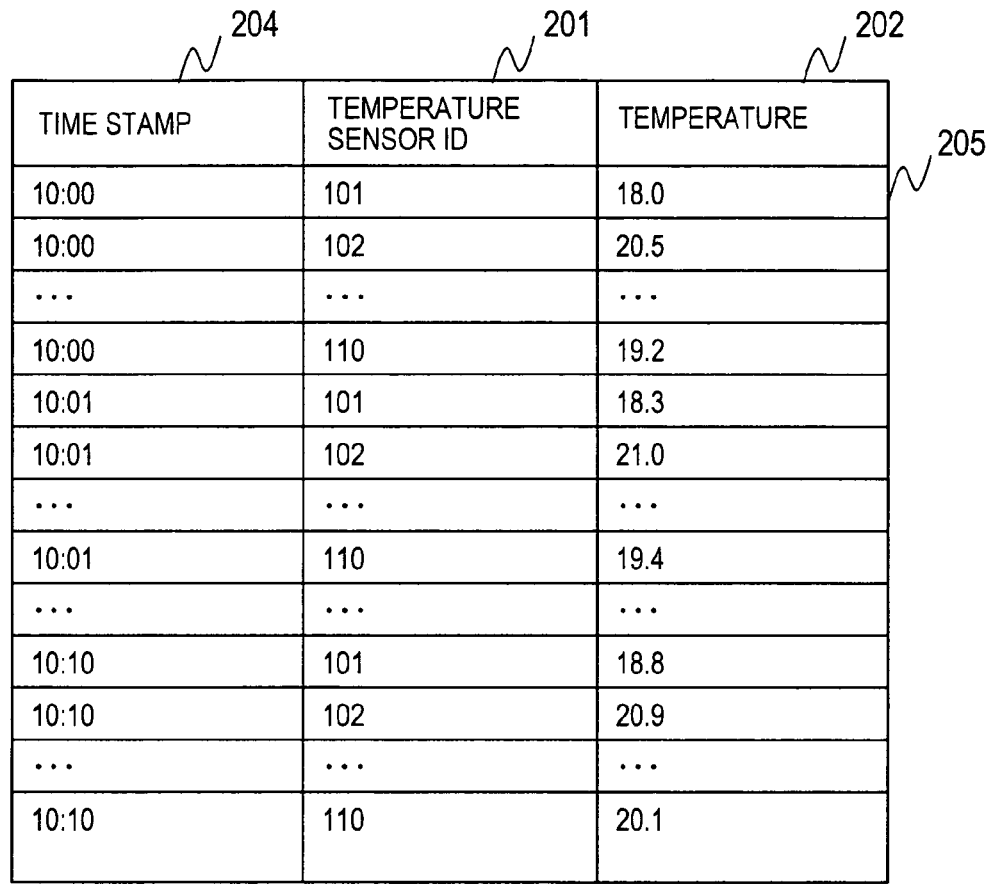
FIG. 4 exemplifies the stream data 108 continuously input, and represents temperature stream data (S1) $108_1$.

FIG. 4 exemplifies the stream data 108 continuously input to the stream data processing system 100, and represents temperature stream data (S1) $108_1$.

In the temperature stream data $108_1$, one row in the table corresponds to the tuple 203, and a time stamp column 204 representing the time of arrival of each tuple is added. For example, a row 205 represents a tuple including "10:00" as the value of the time stamp column 204, "101" as the value of the temperature sensor ID column 201, and "18.0" as the value of the temperature column 202.

Though, according to this embodiment, the time stamp has a format including a time and a minute such as "10:00", the time stamp may have other format such as one typified by a format additionally including a date and a second such as "2006/2/3 9:00:00 JST". The same holds true in the following drawings.

FIGS. 5A to 5C show examples of preferred commands described for being registered/set to the stream data processing system 100 via the command input module 110.

FIG. 5A shows a described example of a query registration command. The query registration command 301 is registered from the user 101 or the application 103 running on the client computer 102 via the command input module 110 to the query setting module 121. The query registration command 301 is a query representing a process which, in last one hour ([Range 1 hour]) of the temperature stream (S1) $108_1$, for respective temperature sensors (GROUP BY temperature sensor ID), calculates the maximum (Max (temperature)) and the minimum (MIN (temperature)), then, for temperature sensors having a difference more than five between the maximum and the minimum (HAVING Max (temperature)−Min (temperature)>5), produces a stream including the temperature sensor ID, the maximum, and the minimum (ISTREAM), and outputs the stream.

FIG. 5B shows a described example of a node split ratio setting command. The node split ratio setting command 302 is registered from the user 101 or the application 103 running on the client computer 102 via the command input module 110 to the index setting module 152. The node split ratio setting command 302, for stream data whose stream name is "S1", and whose column name is "temperature", produces (changes) an index whose index name is "index 1", and sets the node split ratio using "-split ratio" option. Specifically, the node split ratio is set to "5:2" if the key value of the index tends to increase (increase 5:2), to "2:5" if the key value tends to decrease (decrease 2:5), and to "1:1" if the key value shows a random tendency (random 1:1).

FIG. 5C shows a described example of a stream data characteristic information setting command. The stream data characteristic setting command 303 is registered from the user 101 or the application 103 running on the client computer 102 via the command input module 110 to the characteristic information setting module 131. The stream data characteristic information setting command 303 represents that, for the stream data whose stream name is "S1", an increase tendency is present from 6:00 to 13:00 (increase 6:00<=timestamp<13:00), a decrease tendency is present from 0:00 to 3:00, and from 16:00 to 0:00 (decrease 0:00<=timestamp<3:00 AND 16:00<=timestamp<0:00), and a random tendency is present from 3:00 to 6:00 and 13:00 to 16:00 (random 3:00<=timestamp<6:00 AND 13:00<=timestamp<16:00).

Though an example for registering a command via a command line interface (CLI) is described in this embodiment, the registration is not limited to the command line interface. For example, the input having the same connotation may be carried out via a graphic user interface (GUI).

FIG. 6 shows a configuration example of the query management table 122.

A query name column 401 and a query column 402 respectively store registered query names and registered queries at the command input module 110.

A query executable form storage destination column 403 stores addresses (pointers) to a storage destination of an executable form of the query. By producing an executable form in advance, it is possible to eliminate an overhead of compiling required each time the query is executed. This address, for example, indicates a storage position on the memory 12.

A registrant name column 404 and a time and date of registration column 405 respectively store the names of a person who registered the query and dates and times of registering the query acquired when the query is registered, and are used for access management and security management for the system.

For example, a row 406 represents a registered query management table 122 when the query registration command 301 shown in FIG. 5 is registered.

The row 406 represents that the value of the query name column 401 is "Q1", the value of the query column 402 is "SELECT temperature ID, Min (temperature), Max (temperature) FROM S1 [RANGE 1 hour] GROUP BY temperature sensor ID HAVING MAX (temperature)–MIN (temperature)>5", the value of the query executable form storage destination column 403 is "0x7FFFAEE1", the value of the registrant name column 404 is "Kashiyama", and the value of the time and data of registration column 405 is "2006/08/01 13:07:26 JST".

In this case, the input to the I/F, which receives a query, may take any forms including a setting file and an XML file in addition to the command shown in FIG. 5A and the table shown in FIG. 6. The same holds true in the following tables.

FIG. 7 shows a configuration example of the characteristic information management table 132.

A stream data name column 501 stores names of stream data whose characteristic information is to be input. The column name column 502 stores column names of a column in the stream data whose characteristic information is to be input. It is possible to acquire a key tendency by entering a key of index 162 in the column name column 502.

A time stamp range column 503 and a tendency column 504 respectively store range specifications relating to the time information, and tendencies corresponding to the time information. In this case, a value may not be input to the time stamp range column 503.

For example, a row 505 represents that, in stream data whose stream name is "S1", a "temperature" column presents the "increase tendency" "from 6:00 to 13:00". If the stream data characteristic information setting command 300 shown in FIG. 5C is input, rows 505, 506, and 507 are produced.

In this case, though values input to the tendency column 504 include "increase tendency" which represents a key series of an index to be inserted monotonically increasing or increasing not monotonically but as a whole, "decrease tendency" which represents a key series to be inserted monotonically decreasing or decreasing not monotonically but as a whole, "random tendency" which represent a random key series to be inserted without characteristics, "monotonic increase tendency" which represents a key series to be inserted monotonically increasing, "monotonic decrease tendency" which represents a key series to be inserted monotonically decreasing, "diverging" which represents a key series to be inserted diverging on both sides toward the maximum or minimum value, and "converging tendency" which represents a key series to be inserted converging to a certain value, tendencies other than these tendencies may be input. Moreover, as shown in a row 508, multiple tendencies are input, which represents that the tendency switches.

Moreover, the stream data name column 501 and the column name column 502 which store characteristics, may be acquired by referring to the query management table 122. Moreover, the time stamp range column 503 may not be fully filled with information.

FIG. 8 shows a configuration example of the index management table 151.

The index setting module 152 stores a name 701 of an index, a name 702 of stream data, and a name 703 of a column respectively in an index name column 701, a stream data name column 702, and a column name column 703 of the index management table 151.

A key tendency column 704 stores a key tendency of the index. A node type column 705 and a split ratio column 706 respectively store a node type and a corresponding node split ratio.

The stream data processing system 100, based on the index management table 151, issues a split ratio change command to an index 162. Moreover, the node type column 705 may not be fully filled with information.

Moreover, the node split ratio for the random tendency may be a default value predetermined by the system or an arbitrary value. For example, the node split ratio may be 1:1 (split into halves).

For example, a row 707 represents that, for an index whose index name is "index 1", whose stream data name is "S1", and whose column name is "temperature", if the key tendency is the "increase tendency", the node split ratio is set to "5:2" regardless of the node type.

Moreover, a row 708 represents that, if the key tendency is the "decrease tendency", regardless of the node type, the node split ratio is set to "2:5", and a row 709 represents that, if the key tendency is the "random tendency", regardless of the node type, the node split ratio is set to "1:1" ("3:4" if the key storage upper limit is six).

Moreover, as a row 710 or a row 711 represents, a leaf node and an index node may have different node split ratios.

Moreover, as a row 712 or a row 713 represents, the value of the split ratio column 706 may retain node split ratios respectively corresponding to different leaf node positions, which represent a position of a leaf node to which a key is inserted in the index. For example, the row 712 represents that, if the leaf node position is a "left" position, the node split ratio is set to "2:5", if the leaf node position is a "middle" (around the center) position, the node split ratio is set to "1:1", and if the leaf node position is a "right" position, the node split ratio is set to "5:2". A detailed description thereof will be given later with reference to the index management table 151 shown in FIG. 23.

Figure 9:
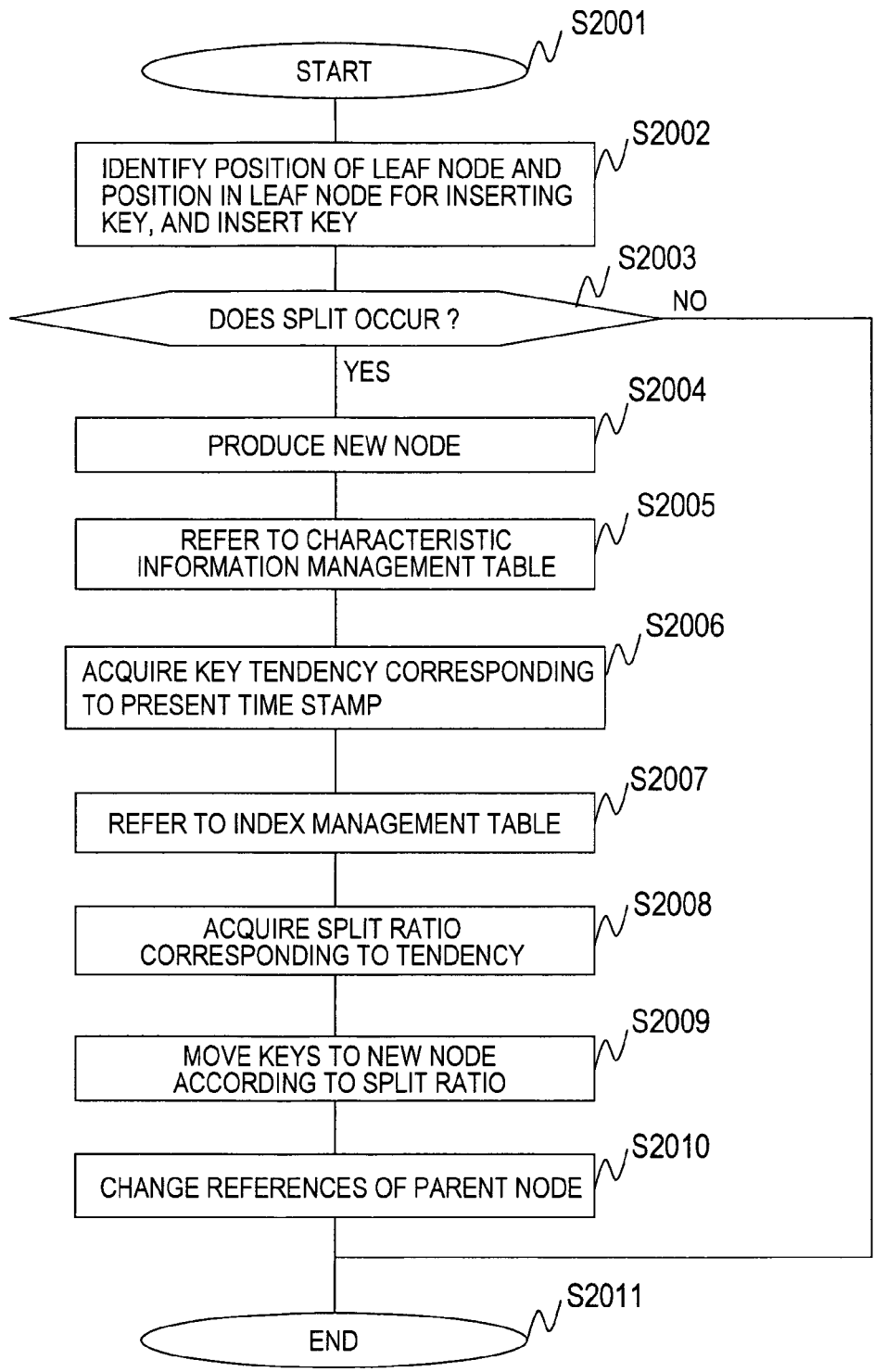
FIG. 9 is a flowchart showing processing steps of index processing upon a key insertion.

FIG. 9 is a flowchart showing an index process executed when a key is inserted into the index 162 by the index management module 150.

In the index process upon the key insertion, first, as for the B-tree index disclosed in R. Elmasri, S. B. Navathe: "Fundamentals of Database Systems, 3rd edition, the United States, Addison-Wesley Professional, August, 1999, ISBN: 0805317554, the index management module 150 inserts a key by identifying a leaf node position into which the key in inserted, and an insertion position in the leaf node (S2002). Then, the index management module 150 determines whether the key storage upper limit is reached in the node to which the key is inserted, and, thus, a node split occurs (S2003). It should be noted that the key storage upper limit is a predetermined value.

If the index management module 150 determines "NO" in the step S2003, the index management module 150 finishes the process (S2011). If the index management module 150 determines "YES" in the step S2003, the index management module 150 produces a new node (S2004).

Then, the index management module 150 refers to the characteristic management table 132 (S2005), and acquires a value of the key tendency column 504 corresponding to a present time stamp (S2006).

Then, the index management module 150 refers to the index management table 151 (S2007), and acquires a value in the split ratio column 706 corresponding to the acquired key tendency (S2008).

Then, the index management module 150 moves keys to the new node according to the acquired split ratio (S2009), changes the references of a parent node (S2010), and finishes the process (S2011).

In this case, if the number of the keys cannot be split into integer numbers according to the node split ratio, the index management module 150 split the number of the keys into numbers whose ratio is closest to the node split ratio.

Moreover, an index process carried out when a key is to be deleted can be executed as in the B-tree index disclosed in R. Elmasri, S. B. Navathe: "Fundamentals of Database Systems, 3rd edition, the United States, Addison-Wesley Professional, August, 1999, ISBN: 0805317554. Moreover, keys may be deleted continuously until a node becomes empty, and the empty node is recovered when the node is empty.

FIGS. 10A to 10D show examples of the node split in the index. A description thereof will be given with reference to the flowchart shown in FIG. 9.

FIGS. 10A to 10D show examples of the index 162 where the key storage upper limit for a leaf node is six, and the key storage upper limit for an index node is four.

FIG. 10A shows an example of the node split for the index 162 when the key tendency is the random tendency. If a key with a key value of "12" is inserted, the index management module 150 executes the step S2002. In the step S2003, the key storage number is one, which does not exceed the key storage upper limit, and, thus, the index management module 150 determines that a node split does not occur, and finishes the process.

Then, keys are inserted in an order of "18, 15, 21, 13, 19", the process is executed as described above, and an index 801 is brought about.

Then, if a key with a key value of "16" is inserted, the key storage number becomes seven in the step S2003, which exceeds the key storage upper limit, so the index management module 150 determines "YES" to an occurrence of the node split. Then, a new node is produced in the step S2004. The index management module 150 determines "YES" to the random tendency in the step S2005, and splits the node according to the node split ratio "1:1 (actually 3:4 as a result of a split into integers)" for the random tendency in the step S2006. In the step S2010, four keys ("16" to "21") are moved to the new node, and a reference from a parent node is changed in the step S2011. In FIG. 10A, there is no parent node, so a parent node is newly produced. A method for producing a new parent node is the same as the method for processing the B-tree index disclosed in R. Elmasri, S. B. Navathe: "Fundamentals of Database Systems, 3rd edition, the United States, Addison-Wesley Professional, August, 1999, ISBN: 0805317554. As a result of the process, the resulting index is configured as an index 802, and the index management module 150 finishes the process.

When the value of keys of the index changes at random, by setting the number of keys to be stored to a node with smaller key values and a node with larger key values to approximately equal (1:1 to 3:4) upon a node split, it is possible to store a next key to either of the split nodes whether the value of the key increases or decreases. As a result, when the value of keys of an index changes at random, it is possible to prevent a node from frequently being split.

FIG. 10B shows an example of the node split when key tendency is the increase tendency.

If keys are inserted in an order of "11, 13, 14, 17, 15, 18", an index 803 is brought about. Then, if a key with a key value of "22" is inserted into the index 803, the index management module 150 determines "YES" to an occurrence of the node split in the step S2003. Then, the index management module 150 determines "YES" to the decrease tendency in the step S2007, and splits the node according to the node split ratio of "5:2" for the increase tendency in the step S2008. A process after the split of the node is the same as that in FIG. 10A. As a result of the process, the resulting index is configured as an index 804, and the index management module 150 finishes the process.

When the key tendency of the index is the increase tendency, by setting the number of keys to be stored to a node with smaller key values larger than that to be stored in a node with larger key values (such as 5:2) when a node is split, it is possible to store a next key in the split node even if the value of the key increases. As a result, when the key tendency is the increase tendency, it is possible to prevent a node from frequently being split.

Figure 10C:
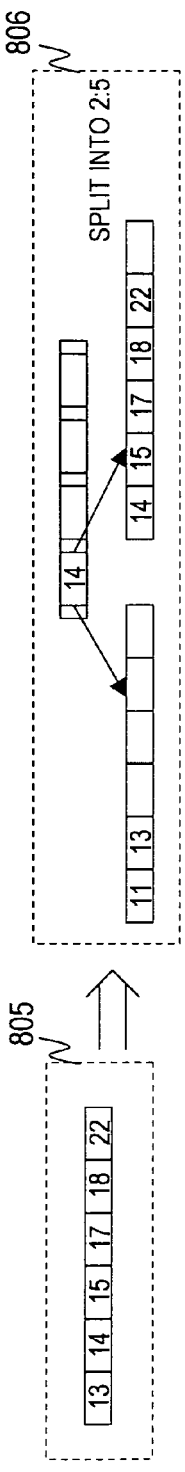
FIG. 10C describes an example of a node split of an index upon a decrease tendency.

FIG. 10C shows an example of the node split when the key tendency is the decrease tendency.

If keys are inserted in a order of "22, 18, 15 17, 14 13", an index 805 is brought about. Then, if a key with a key value of "11" is inserted into the index 804, the index management module 150 determines "YES" to an occurrence of the node split in the step S2003. Then, the index management module 150 determines "NO" to the increase tendency in the step S2007, and splits the node according to the node split ratio of "2:5" for the decrease tendency in the step S2009. A process after the split of the node is the same as that of FIG. 10A. As a result of the process, the resulting index is configured as an index 806, and the index management module 150 finishes the process.

When the key tendency of the index is the decrease tendency, by setting the number of keys to be stored to a node with smaller key values smaller than that to be stored in a node with larger key values (such as 2:5) when a node is split, it is possible to store a next key in the split node even if the value of the key decreases. As a result, when the key tendency is the decrease tendency, it is possible to prevent a node from frequently being split.

Figure 10D:
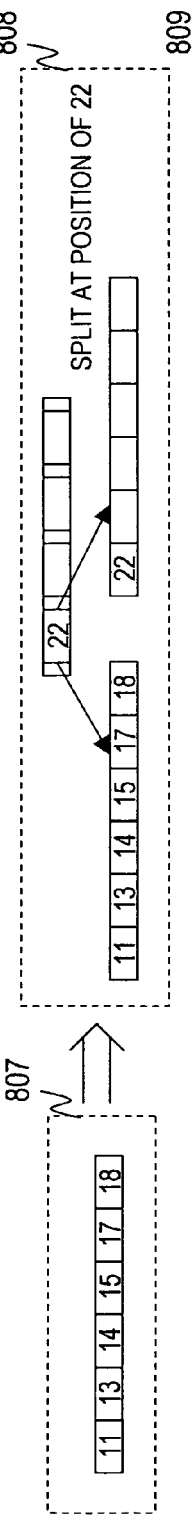
FIG. 10D describes an example of a node split of an index according to a conventional example.

FIG. 10D shows an example of the node split at a key insertion position disclosed in U.S. Pat. No. 5,644,763.

If keys are inserted in the order of "11, 13, 14, 17, 15, 18" as in FIG. 10B, an index 807 is brought about. Then, a key with a key value "22" is inserted into the index 807, since the index management module 150 splits the node at the insertion position (left end), the keys are split into "11, 13, 14, 17, 15, 18" and "22", resulting in an index 808. In this case, data presenting fluctuations, such as a key whose key value is "21", is inserted, a node split occurs again on the left leaf node in the figure, and the keys are split into "11, 13, 14, 17, 15, 18" and "21", resulting in an index 809. The index 809 includes the three leaf nodes, resulting in an increased index capacity. In this way, according to the conventional example, the node split frequently occurs, and the storage system (index area 161) used for storing the index thus increases.

On the other hand, if a key with a key value "21" is inserted into the index 804 shown in FIG. 10B, since the key is inserted into the leaf node on the right side, a node split does not occur, the leaf node number remains two, and the index capacity does not increase.

Though FIGS. 10A to 10C show the examples of splitting a leaf node, an index node can be split in a similar manner.

Figure 11:
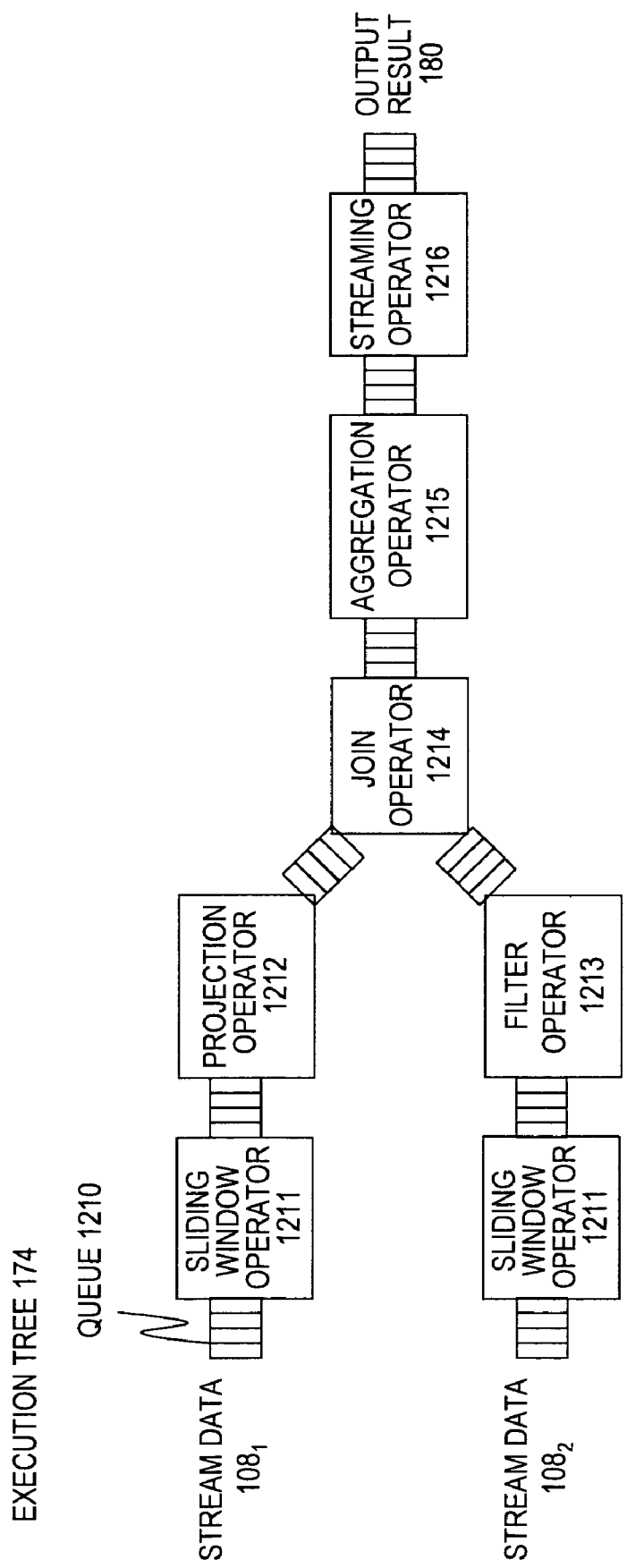
FIG. 11 describes a preferable configuration example of an execution tree for processing a query.

FIG. 11 describes an example of the execution tree 174 of the query executing module 170.

The execution tree 174 includes operators carrying out a process, and queues 1210 connecting the operators with each other. In FIG. 11, the left ends represent inputs, and a right end represents an output. The stream data 108 are input as input data. Moreover, an output result 180 of a query may be input again as the stream data 108.

The operators depend on contents of a process. A sliding window operator 1211 carries out a process to cut a data stream from the stream data 108 by specifying the number of data rows or the time period containing data rows, and converting the stream data into a set of tuples. A projection operator 1212 carries out a process to output only a part of columns of the tuples 203. A filter operator 1213 carries out a process to determine whether a tuple 203 is output or not based on set conditions. A join operator 1214 carries out a process to join two or more stream data 108 under certain conditions. An aggregation operator 1215 carries out aggregation operations such as acquiring a total, an average, the maximum, and the minimum. A streaming operator 1216 carries out a process to convert a tuple set into stream data 108.

The execution tree 174 takes stream data 1081 and stream data 1082 as inputs, and the stream data 108, is processed by the sliding window operator 1211, and is then input to the projection operator 1212. On the other hand, the stream data 108₂ is processed by the sliding window operator 1211, and is input to the filter operator 1213. The execution tree 174 represents an example that an output from the projection operator 1212 and an output from the filter operator 1213 are input to the join operator 1214, an output from the join operator 1214 is processed by the aggregation operator 1215, is finally processed by streaming operator 1216, and is output as the output result 180.

FIG. 12 exemplifies the output result 180 is output from the query executing module 170, and the output result 180 represents an output result when the query registration command 301 shown in FIG. 5A is executed on the temperature stream data (S1) 108₁ shown in FIG. 4.

A time stamp column 1301 and a temperature sensor ID column 1302 respectively correspond to the time stamp column 204 and the temperature sensor ID column 201 shown in FIG. 4. Moreover, the minimum value and the maximum value of the stream data 108 are respectively output to a Min (temperature) column 1303 and a Max (temperature) column 1304.

For example, a row 1305 represents that, at a time stamp "10:00", a temperature sensor with a temperature sensor ID "101" presents the minimum value "12.5" and the maximum value "18.0".

As described above, since frequent node splits can be restrained by causing the index management module 150 to specify node split ratio in the index 162, it is shown that, for data whose key value does not monotonically increase or decrease but presents fluctuations, an index, which is small in capacity, and enables high-speed processing, which is the first object of this invention. Moreover, it is shown that an index which is small in capacity, and enables high-speed processing for data presenting an increase tendency and a decrease tendency in turn, can be provided, which is the second object of this invention.

The first embodiment of this invention has been described above.

This invention is not limited to the first embodiment, and may be modified in various ways within the gist thereof. A description will now be given of other embodiments different from the first embodiment, which can provide similar or further effects, or which are combined with the first embodiment to provide further effects as a result.

Though, according to the embodiment, the significant information obtained by converting the values measured by the sensor node, which a user can understand, is information obtained by converting binary values output from the sensor node into numerical values in a predetermined unit system, the significant information is not limited to this case. For example, an aggregated value of time-series values from the sensor node or an aggregated value of values from multiple sensor nodes may be the significant information. Alternatively, when a sensor node transmits temperature information at an interval of one minute, and if a user wants to know an average temperature (aggregated value of time-series values) for the last one hour, the average temperature for the last one hour is significant information. Moreover, as an example of the aggregated value of the values from multiple sensor nodes, the highest temperature of temperatures from multiple sensor nodes in the same room may be significant information.

Second Embodiment

A description will now be given of a second embodiment of this invention.

While, according to the first embodiment, the key tendency is determined by the characteristic information of the stream data 108 specified by the user 101 or the application 103 running on the computer 102, the second embodiment is characterized by predicting the key tendency using monitoring information of the stream data 108. Processes other than a process for predicting the key tendency may be carried out in a similar manner as in the first embodiment.

According to the second embodiment, in FIG. 1, in the stream data monitoring information management module 140, the stream data monitoring module 141 monitors the stream data 108, and the key tendency predicting module 142 predicts a key tendency based on acquired monitoring information retained in the monitoring information management table 143.

According to the second embodiment, in FIG. 1, the split ratio calculating module 153, the index monitoring information management table 154, the index monitoring module 155, the frequent split detecting module 156, the split history referring module 157, and the reading order controlling module 158 in the index management module 150 are not used.

FIG. 13 shows a configuration example of the monitoring information management table 143 of the stream data monitoring information management module 140.

A time stamp column 601 stores time information at which the monitoring information of the stream data 108 input to the stream data monitoring module 141 according to the first embodiment was acquired.

A stream data name column 602 and a column name column 603 respectively stores the stream data name column 602 to be monitored and the column name 603 to be monitored, which are acquired by referring to the query management table 122 according to the first embodiment. The key tendency predicting module 142 can predict the key tendency by inputting keys of the index 162 into the column name column 603 of the monitoring information management table 143.

An attribute value column 604 stores attribute values corresponding to the column name column 603 of the monitoring information acquired by the stream data monitoring module 141. The attribute value column 604 may not be fully filled with information, and, as for the information stored in the monitoring information management table 143, if information is input to the attribute value column 604, monitoring information corresponding to the attribute value column 604 is input, and if information is not input to the attribute value column 604, monitoring information corresponding to the column name column 603 is input.

A data rate column 605 stores, of the monitoring information acquired by the stream data monitoring module 141, arrival rates of the stream data 108 to be monitored. By acquiring the data rate, it is possible to predict a data quantity of the stream data 108 which will arrive at the stream data processing system 100 subsequently.

A statistical value column 606 stores, of the monitoring information acquired by the stream data monitoring module 141, statistical values after the monitoring information was acquired last time.

A present value column 607 stores, of the monitoring information acquired by the stream data monitoring module 141, latest values.

An increment counter column 608 and a decrement counter column 609 respectively store increment counts and decrement counts acquired by comparing with the previous tuple of the monitoring information acquired by the stream data monitoring module 141, and counting an increment or a decrement. The increment counter column 608 and the decrement counter column 609 respectively store the counts after a time point when the monitoring information was acquired last time.

The tendency prediction column 610 stores key tendencies predicted by the tendency predicting module 142 described later. This predicted value of the key tendency is used to determine the node split ratio of the index 162.

For example, in a row 611, the value of the time stamp column 601 is "10:00", the value of the stream data name column 602 is "S1", the value of the column name column 603 is "temperature", the value of the attribute value column 604 is "temperature sensor ID=101", the value of the date rate column 605 is "30 tuple/minute", the value of the statistical value column 606 is "average=17.5°C", the value of the present value column 607 is "18.0", the value of the increment counter column 608 is "50", the value of the decrement counter column 609 is "4", and the value of the tendency prediction column 610 is "increase tendency".

In FIG. 13, a row 612 in the monitoring information management table 143 represents that a value in the attribute value column 604 is monitoring information corresponding to "temperature sensor ID=102". Moreover, a row 613 represents that a value in the attribute value column 604 is monitoring information acquired by the stream data monitoring module 141 at "10:05", and a row 614 represents that a value in the attribute value column 604 is monitoring information acquired, by the stream data monitoring module 141 at "10:10".

According to the second embodiment, though the example of acquiring the monitoring information at the interval of five minutes is shown, the interval is not limited to five minutes. Moreover, the interval for acquiring the monitoring information may be changed for the respective stream data 108. Moreover, though the monitoring information is added as a new data to the monitoring information management table 143, a row which is no longer necessary may be removed from the monitoring information management table 143.

Moreover, though tuple/minute is described as an example of the data stored in the data rate column 605, the data is not limited to this example. Though the data to be stored in the statistical value column 606 is the statistical information from the time point when the last monitoring information is acquired, the statistical information may have been acquired from a time point before that. Though the data to be stored in the increment counter column 608 and the decrement counter column 609 are the counts from the time point when the last monitoring information is acquired, the counts may have been acquired from a time point before that. Moreover, though the center value and the average value are described as the statistical values 606, the statistical value 606 may be other statistical information such as the variance. Moreover, a part of the statistical information of the stream data, which is described later, may be acquired by monitoring the stream data 108.

Moreover, monitoring information acquisition data to be stored in the attribute value column 604, the data rate column 605, the statistical value column 606, the present value column 607, the increment counter column 608, the decrement counter column 609, and the tendency prediction column 610 may not be fully filled with information, and the monitored items may be set in an arbitrary manner. For example, the monitored items may be set by the command input module 110, may be written in a setting file, or may be default values set by the system in advance if the monitored items are not set.

Figure 14:
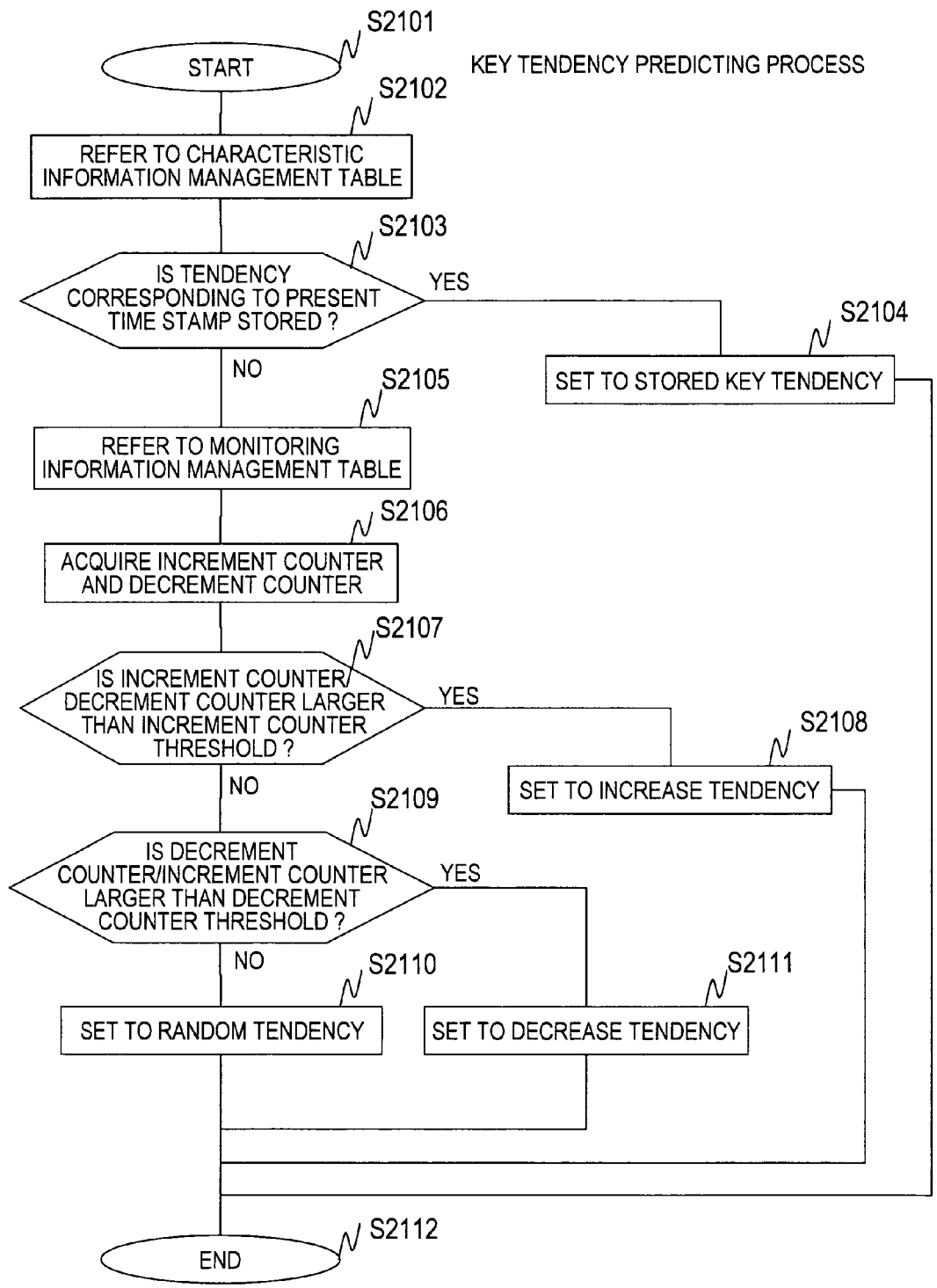
FIG. 14 shows the second embodiment, and is a flowchart showing processing steps of a key tendency predicting process.

FIG. 14 is a flowchart showing a predicting process of the key tendency executed by the key tendency predicting module 142. This process is executed at a predetermined interval.

In the key tendency predicting process, first, the key tendency predicting module 142 refers to the characteristic information management table 132 (S2102), and determines whether a tendency is present in correspondence to the present time stamp (S2103). Specifically, the key tendency predicting module 142 determines whether matching values are stored in the time stamp range column 503 and the tendency column 504 in the characteristic information management table 132 by referring to these columns.

If the key tendency predicting module 142 determines "YES" in the step S2103, the key tendency predicting module 142 sets the key tendency to the key tendency stored in the characteristic information management table 132 (S2104), and finishes the key tendency predicting process (S2112). If the key tendency predicting module 142 determines "NO" in the step S2103, the key tendency predicting module 142 refers to the monitoring information management table 143 (S2105), and acquires the values of the increment counter and the decrement counter (S2106). Specifically, the key tendency predicting module 142 acquires the counts of the increment counter 608 and the decrement counter 609 shown in FIG. 13.

Then, the key tendency predicting module 142 determines whether the count of the increment counter is larger than the count of the decrement counter, specifically whether the ratio of the increment counter to the decrement counter exceeds a predetermined increment counter threshold, namely, whether the relationship "count of increment counter/count of decrement counter> increment counter threshold" is satisfied (S2107).

If the key tendency predicting module 142 determines "YES" in the step S2107, the key tendency predicting module 142 sets the increase tendency to the key tendency (S2108). If the key tendency predicting module 142 determines "NO" in the step S2107, the key tendency predicting module 142 determines whether the count of the decrement counter is larger than the count of the increment counter, specifically whether the ratio of the decrement counter to the increment counter exceeds a predetermined decrement counter threshold, namely, whether the relationship "count of decrement counter/count of increment counter> decrement counter threshold" is satisfied (S2109).

If the key tendency predicting module 142 determines "YES" in the step S2109, the key tendency predicting module 142 sets the key tendency to the decrease tendency (S2111), and finishes the key tendency predicting process (S2112). If the key tendency predicting module 142 determines "NO" in the step S2109, the key tendency predicting module 142 sets the key tendency to the random tendency (S2110), and finishes the key tendency predicting process (S2112).

In this case, in FIG. 14, though the increment counter and the decrement counter are used to predict the key tendency from the monitoring information, the key tendency may be determined by an arbitrary method using the monitoring information. For example, the key tendency predicting module 142 may use the present value column 607 in the monitoring information management table 143 shown in FIG. 13 to acquire the present values at 10:00, 10:05 and 10:10, the key tendency predicting module 142 may set the key tendency to the increase tendency if the present value keeps increasing, to the decrease tendency if the present value keeps decreasing, and to the random tendency if it does not correspond to either case. A detailed description of the process will later be given with reference to a flowchart for the key tendency predicting process shown in FIG. 24.

Though the key tendency predicting module 142 refers to the characteristic information management table 132 in FIG. 14, the key tendency predicting module 142 may determine the key tendency based on only the monitoring information without referring to the characteristic information management table 132. In other words, the steps S2103 and S2104 are not indispensable. Moreover, though a node is split with priority given to the characteristic information in the description above, the node may be split with priority given to the tendency calculated from the monitoring information. Moreover, the key tendency predicting module 142 may compare the tendency calculated from the characteristic information and the tendency calculated from the monitoring information with each other to determine that both match.

Moreover, the increment counter threshold and the decrement counter threshold may be set in an arbitrary way. For example, the monitored items may be set by the command input module 110, may be written in a setting file, or may be default values set by the system in advance if the monitored items are not set. Moreover, the same value may be used as the increment counter threshold and the decrement counter threshold.

The second embodiment of this invention has been described above.

Third Embodiment

A description will now be given of a third embodiment of this invention.

Though, according to the first and second embodiments, the node split ratio is specified by the user or the application running on the computer, the third embodiment is characterized in that, after a position at which a key is to be inserted is identified, the node split ratio is calculated from the key tendency to split the node.

In other words, the key tendency and the node split ratio do not correspond to each other in a one-to-one manner, and the node split ratio is changed according to the position at which the key is inserted.

In this case, though, according to the index processing method disclosed in U.S. Pat. No. 5,644,763, the node is split at the position at which a key is inserted, according to the third embodiment of this invention, a node is split at a position different from the position at which the key is inserted (the node may be split at the position at which the key is inserted).

Processes other than the process for determining the node split ratio are the same as those in the first and second embodiments. The process for determining the key tendency may be any one of the process of the first embodiment (specified by the user 101 or the application 103 running on the computer 102), and the process of the second embodiment (predicting based on the monitoring information).

According to the third embodiment, in FIG. 1, the split ratio calculating module 153 of the index management module 150 refers to the characteristic information management table 132 of the stream data characteristic information management module 130 or the monitoring information management table 143, acquires a key tendency, and acquires a position to insert a key from the index 162, and calculates the node split ratio.

According to the third embodiment, in FIG. 1, at least either one of the stream data characteristic information management module 130 (the characteristic information setting module 131, the characteristic information management table 132), or the stream data monitoring information management module 140 (the stream data monitoring module 141, the key tendency predicting module 142, and the monitoring information management table 143) is used. Moreover, the index monitoring information management table 154, the index monitoring module 155, the frequent split detecting module 156, the split history referring module 157, and the reading order controlling module 158 in the index management module 150 are not used.

According to the third embodiment, the split ratio calculating module 153 dynamically determines the node split ratio from the insertion position and the tendency. If the key tendency is the increase tendency, the node is split such that the keys on the right side of the insertion position are split into halves. In other words, the node is split according to a ratio:

$$\left\lfloor \frac{n_{leaf} + i}{2} \right\rfloor : (n_{leaf} + 1) - \left\lfloor \frac{n_{leaf} + i}{2} \right\rfloor \quad [\text{Eq. 1}]$$

where the key storage upper limit of the leaf node is $n_{leaf}$ and the insertion position thereof is i. On the other hand, if the key tendency is the decrease tendency, the node is split according to a ratio:

$$(n_{leaf} + 1) - \left\lfloor \frac{n_{leaf} + (n_{leaf} + 1 - i)}{2} \right\rfloor : \left\lfloor \frac{n_{leaf} + (n_{leaf} + 1 - i)}{2} \right\rfloor \quad [\text{Eq. 2}]$$

Moreover, an index node is split as a leaf node is split while considering that one key is moved to a parent node. In other words, the node is split according to a ratio:

$$\min\left\{ \left\lfloor \frac{n_{index} + i}{2} \right\rfloor, (n_{index} - 1) \right\} : (n_{index} + 1) - \min\left\{ \left\lfloor \frac{n_{index} + i}{2} \right\rfloor, (n_{index} - 1) \right\} \quad [\text{Eq. 3}]$$

where the key storage upper limit of the index node is $n_{index}$ and the insertion position thereof is i. On the other hand, if the key tendency is the decrease tendency, the node is split according to a ratio:

$$(n_{index} + 1) - \min\left\{ \left\lfloor \frac{n_{index} + (n_{index} + 1 - i)}{2} \right\rfloor, (n_{index} - 1) \right\} : \min\left\{ \left\lfloor \frac{n_{index} + (n_{index} + 1 - i)}{2} \right\rfloor, (n_{index} - 1) \right\} \quad [\text{Eq. 4}]$$

The equations 1 to 4 for calculating the node split ratio are examples, and arbitrary equations may be used. For example, the node split ratio may be determined such that a node split source has a slightly larger vacancy. In this case, a ratio of the margin is input as a parameter.

Figure 15:
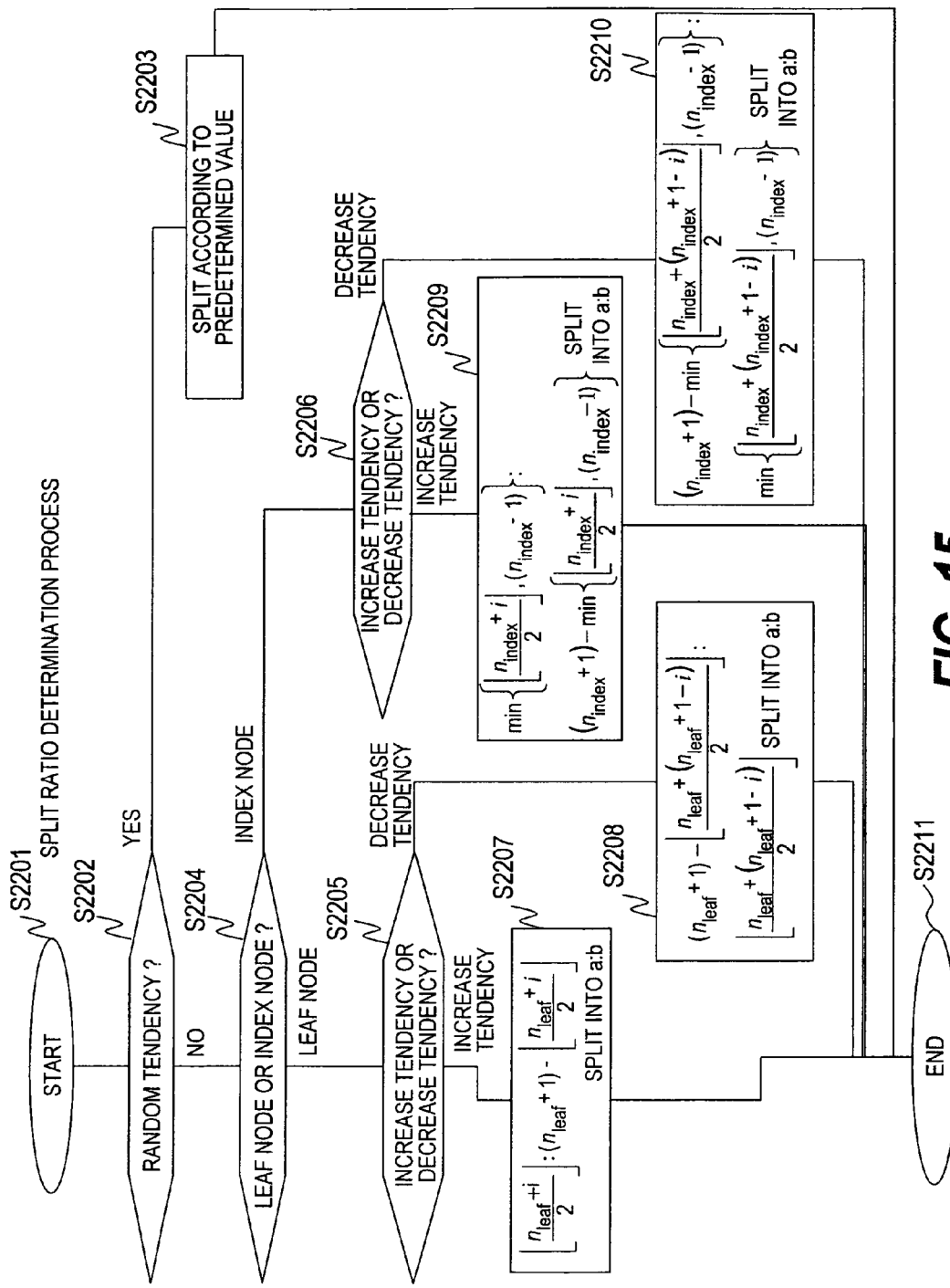
FIG. 15 shows a third embodiment, and is a flowchart showing processing steps of a split ratio calculating process.

FIG. 15 shows a flowchart for a split ratio calculating process. The split ratio calculating process shows a case where a node split occurs as a result of executing the steps S2002 and S2003 shown in FIG. 9.

In the split ratio calculating process, first, the split ratio calculating module 153 determines whether the key tendency (or predicted key tendency value) is the random tendency or not (S2202). In this process, the split ratio calculating module 153 makes the determination with reference to the tendency column 504 in the characteristic information management table 132, and the tendency prediction column 610 in the monitoring information management table 143.

If the split ratio calculating module 153 determines "YES" in the step S2202, the split ratio calculating module 153 sets the node split ratio to a default value predetermined by the system (S2203), and finishes the process (S2211). If the split ratio calculating module 153 determines "NO" in the step S2202, the split ratio calculating module 153 determines whether the node to be split is a leaf node or an index node (S2204).

If the split ratio calculating module 153 determines that the node is a leaf node in the step S2204, the split ratio calculating module 153 determines whether the key tendency is the increase tendency or the decrease tendency (S2205).

If the split ratio calculating module 153 determines that the key tendency is the increase tendency in the step S2205, the split ratio calculating module 153 splits the node according to a ratio (S2207):

$$\left\lfloor \frac{n_{leaf} + i}{2} \right\rfloor : (n_{leaf} + 1) - \left\lfloor \frac{n_{leaf} + i}{2} \right\rfloor \quad [\text{Eq. 5}]$$

and finishes the process (S2211). If the split ratio calculating module 153 determines that the key tendency is the decrease tendency in the step S2205, the split ratio calculating module 153 splits the node according to a ratio (S2208):

$$(n_{leaf} + 1) - \left\lfloor \frac{n_{leaf} + (n_{leaf} + 1 - i)}{2} \right\rfloor : \left\lfloor \frac{n_{leaf} + (n_{leaf} + 1 - i)}{2} \right\rfloor \quad [\text{Eq. 6}]$$

and finishes the process (S2211).

On the other hand, if the split ratio calculating module 153 determines that the node is an index node in the step S2204, the split ratio calculating module 153 determines whether the key tendency is the increase tendency or the decrease tendency (S2206).

If the split ratio calculating module 153 determines that the key tendency is the increase tendency in the step S2206, the split ratio calculating module 153 splits the node according to a ratio (S2207):

$$\min\left\{ \left\lfloor \frac{n_{index} + i}{2} \right\rfloor, (n_{index} - 1) \right\} : (n_{index} + 1) - \min\left\{ \left\lfloor \frac{n_{index} + i}{2} \right\rfloor, (n_{index} - 1) \right\} \quad [\text{Eq. 7}]$$

and finishes the process (S2211). If the split ratio calculating module 153 determines that the key tendency is the decrease tendency in the step S2206, the split ratio calculating module 153 splits the node according to a ratio (S2208):

$$(n_{index} + 1) - \min\left\{ \left\lfloor \frac{n_{index} + (n_{index} + 1 - i)}{2} \right\rfloor, (n_{index} - 1) \right\} : \min\left\{ \left\lfloor \frac{n_{index} + (n_{index} + 1 - i)}{2} \right\rfloor, (n_{index} - 1) \right\} \quad [\text{Eq. 8}]$$

and finishes the process (S2211).

In this case, the default value predetermined by the system may be any value. For example, the node split ratio may be 1:1 (divided into halves).

FIGS. 16A to 16D are diagrams showing a comparison between the node split according to the node split ratio calculated based on the key tendency and the key insertion position, and the node split according to the conventional example, and the first and second embodiments.

FIG. 16A shows an index where the key tendency is the decrease tendency, and the keys are inserted in an order of "23, 21, 19, 17, 15, 13, 11, 9, 7, 5, 3, 1" according to the third embodiment. The node splits occurs on a leaf node when the key "15" is inserted and when the key "7" is inserted, and an index 901 is produced. In other words, an increase of the node split number and the node number can be restrained, and it is thus possible to provide an index, which is small in capacity, and enables high-speed processing, for data presenting an increase tendency and a decrease tendency in turn.

FIG. 16B shows an index (only leaf nodes) 902 when the keys are inserted in an order of "2, 4, 6, 8" according to the index processing method disclosed in U.S. Pat. No. 5,644,763 which splits a node at an insertion position. As the index 902 shows, when the key "2" is inserted, a node split according to 1:4 occurs, when the key "4" is inserted, a node split according to 2:3 occurs, and when the key "8" is inserted, a node split according to 4:1 occurs. As a result, one leaf node "1, 3, 5, 7" is split into four leaf nodes "1", "2, 3", "4, 5, 6, 7", and "8", resulting in a large number of nodes. Moreover, if keys are inserted in an order of "10, 12, 14, 16" in a similar manner, one leaf node "9, 11, 13, 15" is split into four leaf nodes. In this way, in the conventional example, the node split frequently occurs.

Figure 16C:
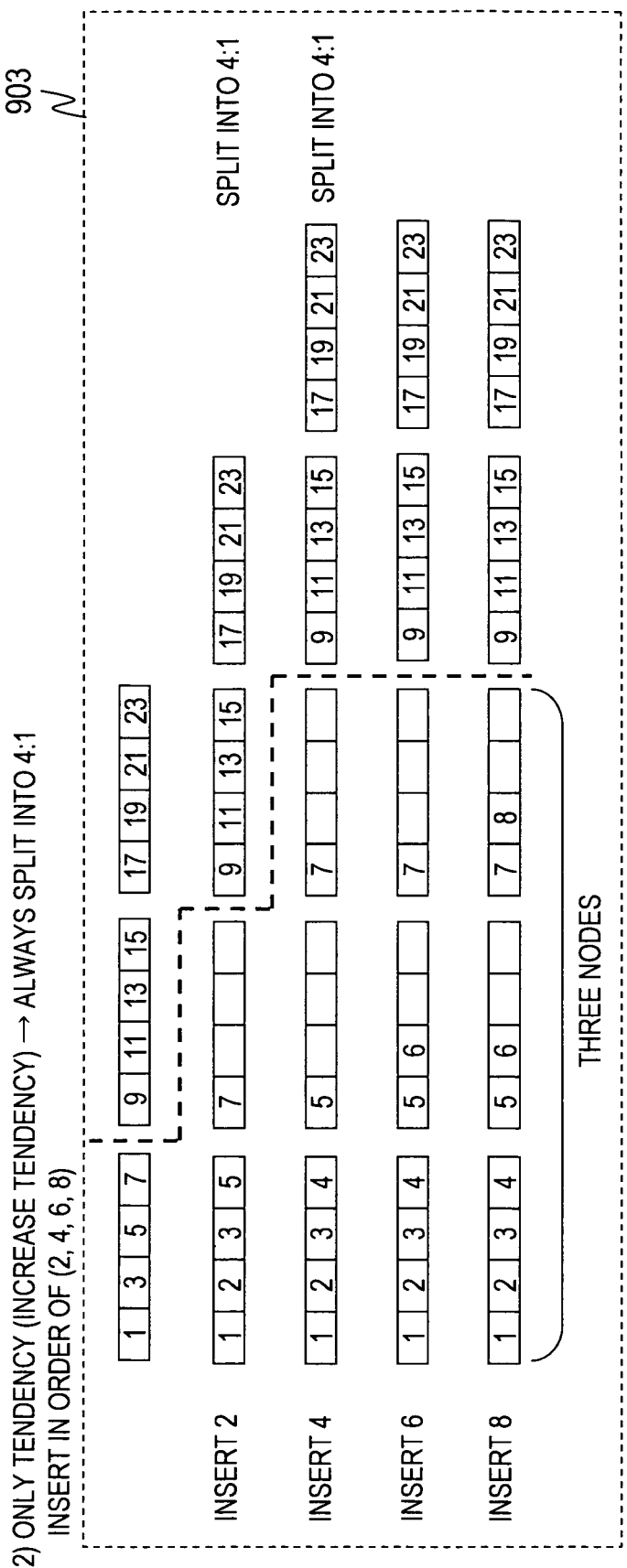
FIG. 16C shows the third embodiment, and describes an example of an index in an index processing method where a node split ratio is specified.
Figure 16D:
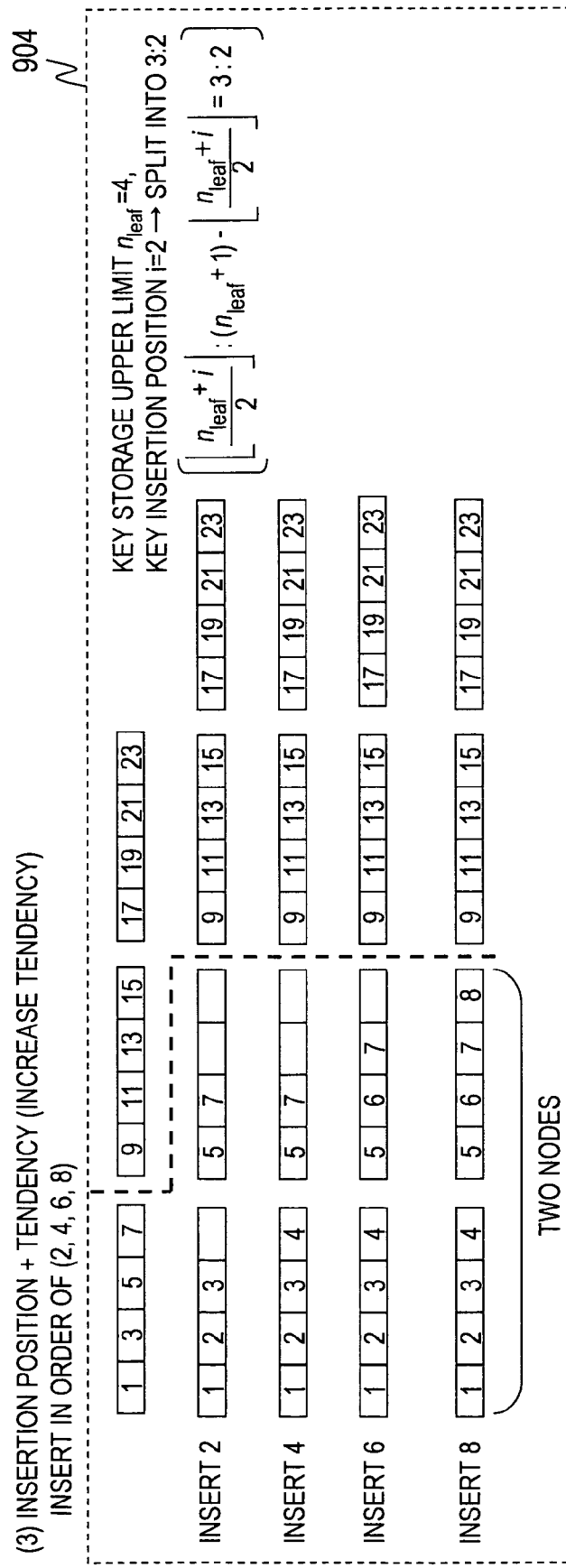
FIG. 16D shows the third embodiment, and describes an example of an index in an index processing method which calculates a node split ratio according to a key tendency and a key insertion position, and splits a node.

FIG. 16C shows an index (only leaf nodes) when the decrease tendency is switched to the increase tendency, and the keys are inserted in an order of "2, 4, 6, 8" according to the index processing method disclosed in the first or second embodiment where the node split ratio is specified by the user or the application 103 running the computer 102. In the example shown in FIG. 16C, the node split ratio for the increase tendency is 4:1. As the index 903 shows, when the key of "2" is inserted, the node split according to 4:1 occurs, and when the key of "4" is inserted, the node split according to 4:1 occurs. As a result, one leaf node of "1, 3, 5, 7" is split into three leaf nodes "1, 2, 3, 4", "5, 6", and "7, 8", so the number of the node splits is smaller than that of the conventional example shown in FIG. 16B, but the number of the nodes is large. Moreover, if keys are inserted in an order of "10, 12, 14, 16" in a similar manner, one leaf node "9, 11, 13, 15" is split into three leaf nodes. FIG. 16D shows an example of the index processing method according to the third embodiment which calculates the node split ratio based on the key tendency and the key insertion position, and splits a node. FIG. 16D shows an index (only leaf nodes) when key tendency switches from the decrease tendency to the increase tendency, and keys are inserted in an order of "2, 4, 6, 8". As the index 904 shows, when the key of "2" is inserted, the node split occurs.

In the flowchart shown in FIG. 15, in the step S2202, the key tendency is the increase tendency, thus, the split ratio calculating module 153 determines "NO", determines that the node is a leaf node in the step S2204, determines the key tendency is the increase tendency in the step S2205, and thus executes the step S2207.

Since the key storage upper limit $n_{leaf}=4$, and the key insertion position i=2, the node is split according to:

$$\left\lfloor \frac{n_{leaf}+i}{2} \right\rfloor : (n_{leaf}+1) - \left\lfloor \frac{n_{leaf}+i}{2} \right\rfloor = \quad [\text{Eq. 9}]$$

$$\left\lfloor \frac{4+2}{2} \right\rfloor : (4+1) - \left\lfloor \frac{4+2}{2} \right\rfloor = 3:2$$

As a result, one leaf node of "1, 3, 5, 7" is split into two leaf nodes "1, 2, 3, 4", and "5, 6, 7, 8", and the number of the nodes is smaller than those of indexes shown in FIGS. 16B and 16C. Moreover, similarly, if keys are inserted in an order of "10, 12, 14, 16" in a similar manner, one leaf node of "9, 11, 13, 15" is split into two leaf nodes.

In this case, according to the flowchart shown in FIG. 15, if the node split for the decrease tendency is carried out, when the key of "15" is inserted, a node is split according to:

$$(n_{leaf}+1) - \left\lfloor \frac{n_{leaf}+(n_{leaf}+1-i)}{2} \right\rfloor : \left\lfloor \frac{n_{leaf}+(n_{leaf}+1-i)}{2} \right\rfloor = \quad [\text{Eq. 10}]$$

$$(4+1) - \left\lfloor \frac{4+4}{2} \right\rfloor : \left\lfloor \frac{4+4}{2} \right\rfloor = 1:4$$

Similarly, when a key of "7" is inserted, a node split according to 1:4 occurs, an index same as the index 901 is produced.

In this way, by determining a node split ratio according to an insertion position of a key and a tendency of the value of the key, it is possible to prevent the node split from frequently occurring for a key of an index presenting fluctuations. Especially, if the key tendency is the increase tendency, by sparing a room on a node with small key values for storing keys, even if the value of the key decreases, it is possible to prevent the node split from frequently occurring.

The third embodiment of this invention has been described above.

Fourth Embodiment

A description will now be given of a fourth embodiment of this invention.

According to the first and second embodiments, the node split ratio is specified by the user 101 or the application 103 running on the computer 102, and according to the third embodiment, after a position at which a key is to be inserted is identified, the node split ratio is calculated from the key tendency. However, any of embodiments do not have means to determine whether the node split ratio is correct or not. The fourth embodiment is characterized in that, a frequent node split is detected by monitoring an index, and, then, acquiring monitoring information (such as statistical information) of the index, and processes such as changing the node split ratio and calculating again the key tendency are carried out.

The forth embodiment can carry out the index process in a similar manner as the first to third embodiments other than adding a processes for detecting the frequent node split, and a process carried out if the frequent node split occurs.

According to the fourth embodiment, in FIG. 1, the index monitoring module 155 monitors the index 162, and the frequent split detecting module 156 detects a frequent node split based on the acquired monitoring information stored in the index monitoring information management table 154. Moreover, if the node split is frequently occurring, the frequent split detecting module 156 may instruct the index setting module 152 to change the node split ratio, or may instruct the key tendency predicting module 142 to predict again the key tendency.

According to the fourth embodiment, in FIG. 1, either the stream data characteristic information management module 130 (the characteristic information setting module 131, the characteristic information management table 132), or the stream data monitoring information management module 140 (the stream data monitoring module 141, the key tendency predicting module 142, and the monitoring information management table 143) can be omitted. Moreover, the split history referring module 157 and the reading order controlling module 158 in the index monitoring module 150 are not used.

FIG. 17 shows a configuration example of the index monitoring information management table 154 of the index management module 150.

The time stamp column 1001 stores information on a time when the index monitoring module 155 acquires the monitoring information of the index 162 stored in the storage system 160.

The index name column 1002, the stream data name column 1003, and the column name column 1004 respectively store index names to be monitored, stream data names to be monitored, and column names to be monitored acquired by referring to the index management table 151 shown in FIG. 8.

An attribute value column 1005 stores, of the monitoring information acquired by the index monitoring module 155, attribute values corresponding to the column name column 1004. The attribute value column 1005 may not be fully filled with information, and, as for the information stored in the index monitoring information management table 154, if information is input to the attribute value column 1005, monitoring information corresponding to the attribute value column 1005 is input, and if information is not input to the attribute value column 1005, monitoring information corresponding to the column name column 1004 is input.

A fill factor column 1006 stores, of the monitoring information acquired by the index monitoring module 155, fill factors of indexes to be monitored. The fill factor is a rate representing the number of keys presently used to the number of the keys stored in the index. If the fill factor is 100%, all the keys are being used.

The node split number column 1007 stores, of the monitoring information acquired by the index monitoring module 155, node split numbers of indexes to be monitored. In FIG. 17, though the node split number since the monitoring information was acquired last time is stored, the cumulative total of the node split number may be stored.

A node split ratio column 1008 stores, of the monitoring information acquired by the index monitoring module 155, node split ratios of indexes to be monitored. In FIG. 17, it is possible to acquire a previous split history used to accumulate the monitoring information.

For example, a row 1009 represents that the value of the time stamp column 1001 is "2006/08/01 10:00:00 JST", the value of the index name column 1002 is "index 1", the value of the stream data name column 1003 is "S1", the value of the column name column 1004 is "temperature", the value of the attribute value column 1005 is "temperature sensor ID=101", the value of the fill factor column 1006 is "80%", the value of the node split number column 1007 is "6", and the value of the node split ratio column 1008 is "3:1".

According to the fourth embodiment, though the example of acquiring the monitoring information at the interval of five minutes is shown, the interval is not limited to five minutes. Moreover, the interval for acquiring the monitoring information may be changed for the respective stream data. Further, though the monitoring information is added to the table, rows which are no longer necessary may be deleted.

Moreover, though the data to be stored in the time stamp has the format "2006/08/01 10:00:00 JST", the format of the data is not limited to this format, and may be an arbitrary format such as "10:00".

Moreover, the attribute value column 1005, the fill factor column 1006, the node split number column 1007, and the node split ratio column 1008 may not be fully filled with information, and the monitored items may be set in an arbitrary manner. For example, the monitored items may be set by the command input module 110, may be written in a setting file, or may be default values set by the system in advance if the monitored items are not set.

FIG. 18 is a flowchart showing the frequent split detecting process and split ratio determination process executed by the frequent split detecting module 156 when a frequent split is detected.

In the split ratio determination process when a frequent split is detected or is occurring, first, the frequent split detecting module 156 refers to the index monitoring information management table 154 shown in FIG. 17 (S2302). Then, the frequent split detecting module 156 acquires a value in the fill factor column 1006 of the index monitoring information management table 154 (S2303), and determines whether the fill factor exceeds the predetermined fill factor threshold, or "fill factor >fill factor threshold" is satisfied (S2304). The fill factor threshold may be set in arbitrary ways. For example, the fill factor threshold may be set by the command input module 110, may be written in a setting file, or may be default values set by the stream data processing system 100 in advance if the fill factor threshold is not set.

The frequent split detecting module 156, upon determining "YES" in the step S2304, acquires a value of the node split number column 1007 from the index monitoring information management table 154 (S2305). Then, the frequent split detecting module 156 refers to the monitoring information management table 143 (S2306), and acquires a value in the data rate column 605 (S2307). Then, the frequent split detecting module 156 calculates a predicted split number based on the value of the data rate acquired in the step S2307, and the key storage upper limit of the index 162 (S2308). An equation for the calculation can be "data rate×time/key storage upper limit". The equation is an example, and the equation is not limited to this example. For example, "data rate×time×2/key storage upper limit", which is an constant multiple of the equation, can be the predicted split number, and the equation may be an arbitrary equation.

Then, the frequent split detecting module 156 compares the node split number acquired in the step S2305 and the predicted split number calculated in the step S2308 with each other, and determines whether the node split number is largely exceeding the predicted split number, namely, whether "split number/predicted split number>predicted split number threshold" (S2309). The predicted split number threshold may be set in arbitrary ways. For example, the predicted split number threshold may be set by the command input module 110, may be written in a setting file, or may be default values set by the system in advance if the predicted split number threshold is not set.

If the frequent split detecting module 156 determines "NO" in the step S2309, the frequent split detecting module 156 determines that the node split is not frequently occurring, and finishes the process (S2315). If the frequent split detecting module 156 determines "YES" in the step S2309, or determines "NO" in the step S2304, the frequent split detecting module 156 determines that the node split is frequently occurring, and causes the stream data monitoring module 141 to acquire the monitoring information again to update the monitoring information management table 143 (S2310). Then, the frequent split detecting module 156 causes the key tendency predicting module 142 to predict the key tendency again (S2311). Then, the frequent split detecting module 156 determines whether the key tendency predicted again in the step S2310, and the key tendency which has been used previously are the same or not (S2312).

If the key tendency predicting module 142 determines "YES" in the step S2311, the key tendency predicting module 142 sets the key tendency to the random tendency (S2313), and finishes the process (S2315). If the key tendency predicting module 142 determines "NO" in the step S2311, the key tendency predicting module 142 sets the key tendency to the key tendency predicted again (S2314), and finishes the process (S2315).

In this case, the process in the steps S2303 and S2304 or the process in the steps S2305, S2306, S2307, S2308, and S2309 can be omitted, and remaining one of the two processes may detect a frequent node split.

Moreover, the process in the steps S2310, S2311, S2312, and S2313 is not indispensable, and the key tendency predicting module 142 may always set the key tendency to the random tendency upon a frequency node split. Moreover, the key tendency predicting module 142 may simply detect the frequent node split. In this case, the tendency predicting module 142 may output the frequent node split on a screen or as a log file.

With reference to the example of the index monitoring information management table 154 shown in FIG. 17, a specific description will now be given. In this case, the fill factor threshold is "70%", the key storage upper limit is "10", and the predicted split number threshold is "1.5".

The frequent split detecting module 156 refers to a row 1010 in the index monitoring information management table 154 (S2302), and acquires the value of the fill rage column 1006, which is "78%" (S2303). Since this value exceeds the fill factor threshold "70%", the frequent split detecting module 156 determines "NO" in the step S2304. Then, the frequent split detecting module 156 acquires the value of the node split number column 1007, which is "7" (S2305).

Then, the frequent split detecting module 156 refers to the row 613 in the monitoring information management table 143 shown in FIG. 13 (S2306), and acquires the value in the data rate column 605, which is "30 tuple/minute" (S2307). Then, the frequent split detecting module 156, based on the equation of "data rate×time/key storage upper limit", calculates the predicted split number, which is "30×1 (minute)/6=5" (S2308). Then, the frequent split detecting module 156, based on the equation of "split number/predicted split number>predicted split number threshold", compares the node split number and the predicted split number with each other, which is "7/5=1.4", and does not exceed the predicted split number threshold "1.5", thus determines "NO" in the step S2309, and finishes the process (S2314).

When five minutes, which is a predetermined monitoring interval, elapses, and the time stamp becomes "2006/08/01 10:10:00 JST", the frequent split detecting module 156 refers to a row 1011 of the index monitoring information management table 154, and the node split number is "198−180=18". As result of the determination in the step S2309, "split number/predicted split number=18/5=3.6", which exceeds the predicted split number threshold of "1.5", and, thus, the frequent split detecting module 156 determines "YES".

If the key tendency calculated again is the increase tendency (S2310), the frequent split detecting module 156 determines "NO" in the step S2311, sets the key tendency to the increase tendency (S2313), changes the value of the node split ratio column 1008 from "3:1" to "1:3", and finishes the process (S2314). Simultaneously, the frequent split detecting module 156 updates the index management table 151.

As described above, according to the fourth embodiment, if a frequent node split is detected by monitoring the index, and acquiring the index monitoring information, the split ratio is changed, or the key tendency (or the key tendency predicted value) is calculated again. As a result, by feeding back the actual node split number to the determined result of the key tendency and the determined result of the split ratio, it is possible to correct an error in the determined results of the key tendency and the split ratio. As a result, even if the fluctuation of the stream data 108 exceeds a predicted range for designing the stream data processing system 100, it is possible to restrain the node split from frequently occurring, and to restrain the index capacity from increasing.

The fourth embodiment of this invention has been described above.

Fifth Embodiment

A description will now be given of a fifth embodiment of this invention.

Though, according to the first and second embodiments, the node split ratio is specified by the user 101 or the application 103 running on the computer 102, and according to the third embodiment, after a position at which a key is to be inserted is identified, the node split ratio is calculated from the key tendency. The fifth embodiment is characterized in that the node split ratio is determined based on a previous node split history.

Processes other than the process for determining the node split ratio are the same as those in the first to third embodiments. Moreover, the frequent node split detecting process according to the fourth embodiment may be carried out in combination.

According to the fifth embodiment, in FIG. 1, the index monitoring module 155 monitors the index 162, and retains the history of the node split in the index monitoring information management table 154. The split history referring module 157 determines the node split ratio by searching for node split history information having the same time conditions, which are a date, a time, and a day of the week, as that of the present time based on the split history information acquired by the index monitoring module 155, and stored in the index monitoring information management table 154. Moreover, attribute information such as weather, temperature, and event information stored on an external recording medium may be used as external attribute conditions to narrow down the search. It should be noted that the external recording medium includes a storage system accessible from the stream data processing system 100, for example.

According to the fifth embodiment, in FIG. 1, either one or both of the stream data characteristic information management module 130 (the characteristic information setting module 131, the characteristic information management table 132), and the stream data monitoring information management module 140 (the stream data monitoring module 141, the key tendency predicting module 142, and the monitoring information management table 143) can be omitted. Moreover, the split ratio calculating module 153 and the frequent split detecting module 156 in the index management module 150 are not indispensable. The reading order controlling module 158 in the index monitoring module 150 is not used.

Figure 19:
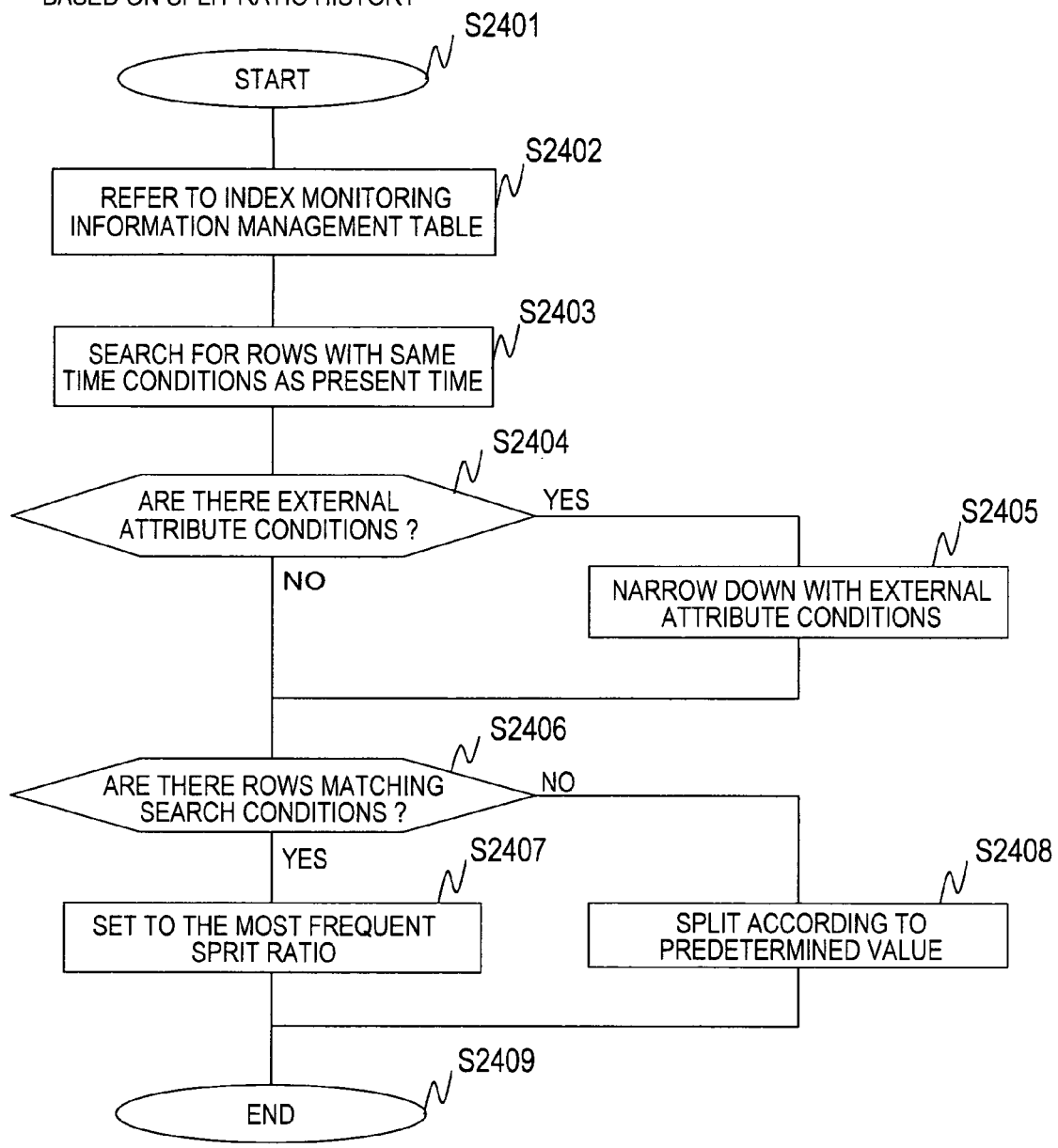
FIG. 19 shows a fifth embodiment, and is a flowchart showing processing steps of a split ratio determination process according to a split ratio history.

FIG. 19 is a flowchart of a split ratio determination process executed by the split history referring module 157 based on the split ratio history.

In the split ratio determination process based on the split ratio history, first, the split history referring module 157 refers to the index monitoring information management table 154 (S2402). Then, the split history referring module 157 searches the index monitoring information management table 154 for rows having the same time conditions, which are a date, a time, and a day of the week, as those of the present time (S2403).

Then, the split history referring module 157 determines whether there are attribute information stored in the external recording medium and whether the external attribute information is to be used for narrowing down (S2404). If the split history referring module 157 determines "YES" in the step S2404, the split history referring module 157 further narrows down the search using the external conditions (S2405).

If the split history referring module 157 determines "NO" in the step S2404 or the step S2405 is finished, the split history referring module 157 determines whether there are rows matching the conditions used for the search in the step S2403 or the narrowed down conditions used for the search in the step S2405 (S2406).

If the split history referring module 157 determines "YES" in the step S2406, the split history referring module 157 sets a node split ratio with the highest frequency as the node split ratio (S2407), and finishes the process (S2409). If the split history referring module 157 determines "NO" in the step S2406, the split history referring module 157 splits the node according to a value predetermined by the system (S2408), and finishes the process (S2409).

In this case, in the step S2407, though the split history referring module 157 sets the node split ratio with the highest frequency to the node split ratio, the node split ratio is not limited to this example, and may be an average of the ratios of the matching rows.

Moreover, the value predetermined by the system may be any value. For example, the node split ratio may be 1:1 (divided into halves).

With reference to the index monitoring information management table 154 shown in FIG. 17, a specific description will be given.

The description will be given of a process for determining the node split ratio at a certain time point "2006/08/02 10:00:00 JST". Moreover, only an external attribute condition "weather=fine" is used for narrowing down the search, and weather information of "weather=fine" corresponding to the time information "2006/08/01 10:00:00 JST" on the row 1009 is stored in the external recording medium.

First, the split history referring module 157 refers to the index monitoring information management table 154 shown in FIG. 17 (S2402), and searches for node split ratio histories including "10:00:00", which is the present time, for example, as the value of the time stamp column 1001 (S2403). As a result of this search, the row 1009 matches, and the value of the node split ratio column 1008 is "3:1". In the step S2404, due to the external condition "weather=fine", the split history referring module 157 determines "YES", and narrows down the search in a step S2605. In this case, the weather information in the row 1009 satisfies the external attribute information, so the matching row remains one. In a step S2406, since there is one matching row, the split history referring module 157 determines "YES", since there is one matching row in a step S2407, the node split ratio of "3:1" of the row 1009 is selected, and finishes the process (S2409).

As described above, according to the fifth embodiment, it is possible to set a node split ratio optimal for the present time and the present environment based on the previous split history, and is thus possible to provide the index 162 optimal for searching for the stream data 108 presenting fluctuations such as stream data 108 of a temperature whose key tendency changes in relation to time, and stream data 108 whose key tendency change under environmental conditions such as a climate.

The fifth embodiment of this invention has been described above.

Sixth Embodiment

A description will now be given of a sixth embodiment of this invention.

According to the first to fifth embodiments, keys are inserted in the ascending order in a node. However, upon the decrease tendency, data are moved every time a key is inserted, and a load on the process thus increases, which does not allow real time processing, or delays the index processing. The sixth embodiment is characterized in that the index 162 includes reading order flags, and the storage order of keys are changed according to the reading order flag.

Processes other than inserting/deleting keys and the node split process may be carried out in a similar manner as in the first to fifth embodiments.

According to the sixth embodiment, in FIG. 1, the reading order controlling module 158 controls the reading order based on the reading order flags of the index 162.

According to the sixth embodiment, in FIG. 1, either the stream data characteristic information management module 130 (the characteristic information setting module 131, the characteristic information management table 132), or the stream data monitoring information management module 140 (the stream data monitoring module 141, the key tendency predicting module 142, and the monitoring information management table 143) can be omitted. Moreover, the split ratio calculating module 153, the index monitoring information management table 154, the index monitoring module 155, and the frequent split detecting module 156 in the index management module 150 are not indispensable.

Figure 21A:
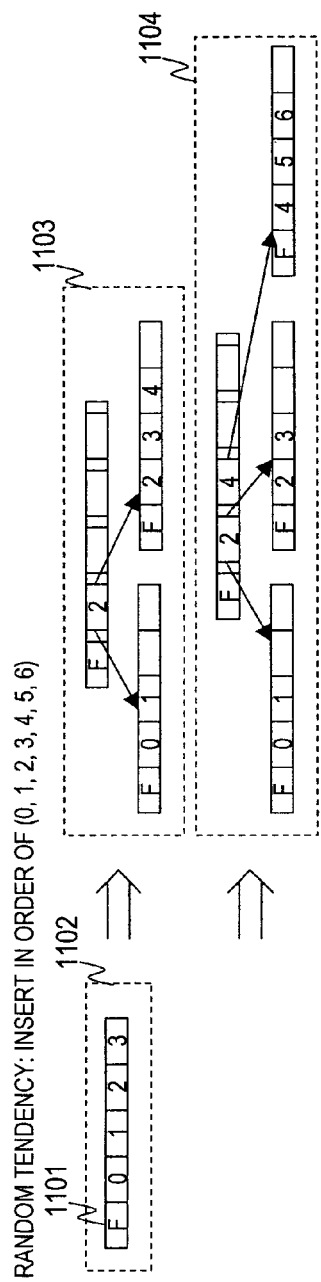
FIG. 21A shows the sixth embodiment, and describes an example of an index with the random tendency in the key insertion process based on reading order flags.
Figure 21B:
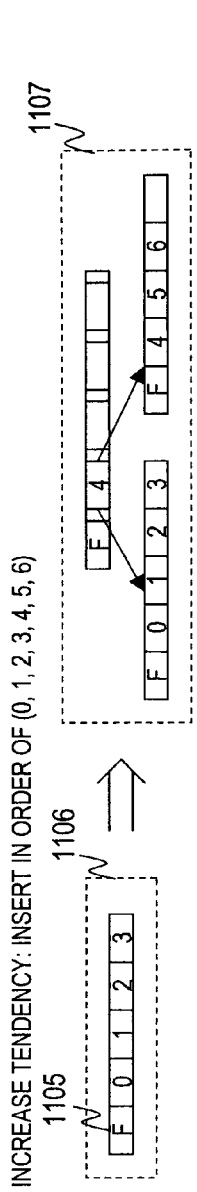
FIG. 21B shows the sixth embodiment, and describes an example of an index with the increase tendency in the key insertion process based on the reading order flags.
Figure 21C:
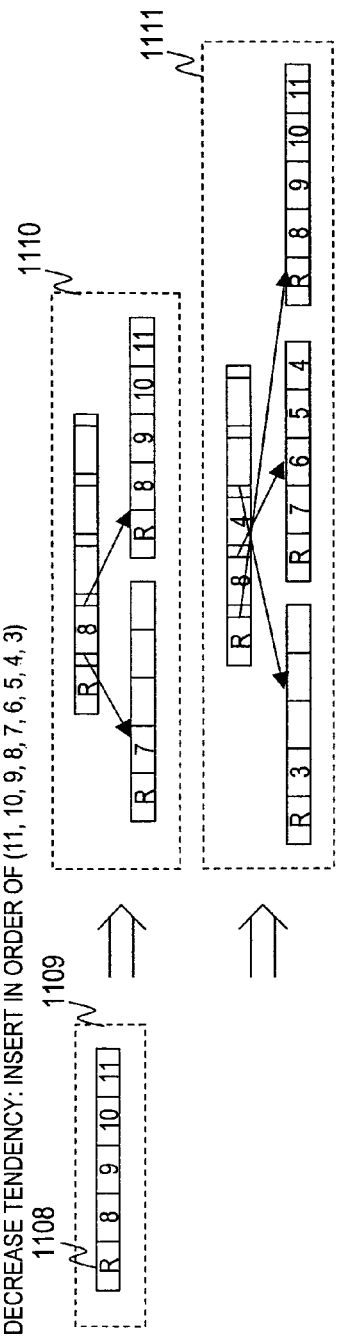
FIG. 21C shows the sixth embodiment, and describes an example of an index with the decrease tendency in the key insertion process based on reading order flags.

According to the sixth embodiment, the reading order flag has a value "F" which indicates a forward order (ascending order), and "R" which indicates a reverse order (descending order), if the value is "F", values of keys are read from the head of a node (left side of the index 1102 of FIG. 21A) in the ordinary order, and if the value is "R", values of keys are read from the tail of a node (right side of the index 1110 of FIG. 21C). "F" and "R" are examples of the values of the reading order flag, and the values are not limited to them. For example, the values may be "0" and "1".

Figure 20:
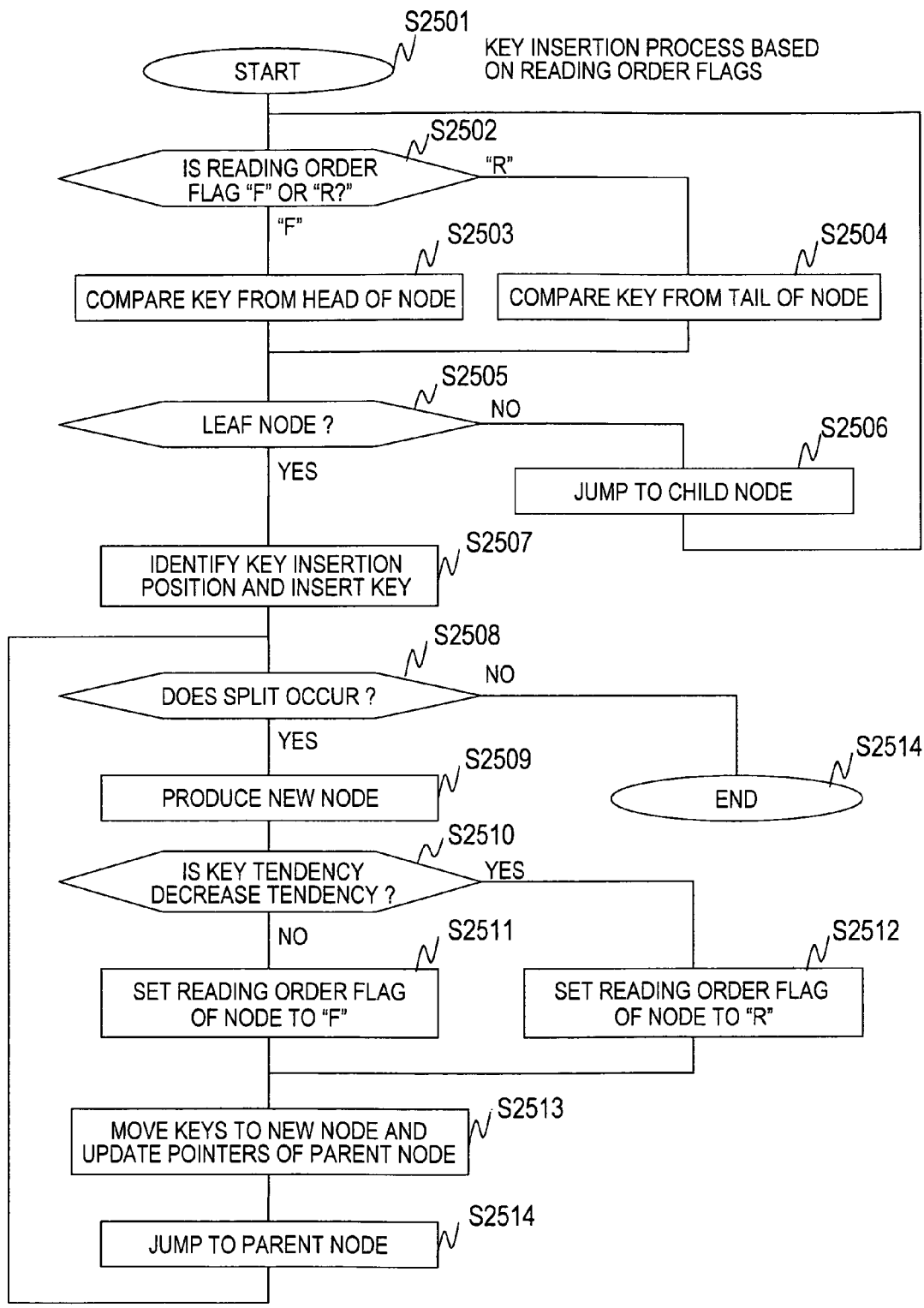
FIG. 20 shows a sixth embodiment, and is a flowchart showing processing steps of a key insertion process based on reading order flags.

FIG. 20 is a flowchart for a key insertion process based on the reading order flags. The sixth embodiment is different in a process for identifying a position for inserting a key from the B-tree index disclosed in R. Elmasri, S. B. Navathe: "Fundamentals of Database Systems, 3rd edition, the United States, Addison-Wesley Professional, August, 1999, ISBN: 0805317554. Thus, a description will now be given of the process to identify an insertion position.

In the key insertion process based on the reading order flag, first, it is determined whether the reading order flag is "F" or "R" (S2502).

If "F" (forward order) is determined in the step S2502, the key is compared from the head of the node (S2503), and it is determined whether the node being processed is a leaf node or not (S2505). If "R" (reverse order) is determined in the step S2502, the key is compared from the tail of the node (S2504), and it is determined whether the node being processed is a leaf node or not (S2505).

If "NO" is determined in the step S2505, the process jumps to a corresponding child node (S2506), and the process returns to the step S2502. The process from the step S2502 to the step S2505 are repeated until a leaf node is reached. If "YES" is determined in the step S2505, a key insertion position is identified, and the key is inserted (S2507).

Then, it is determined whether a node split occurs as a result of the key insertion in the step S2507 (S2508).

If "NO" is determined in the step S2508, the process is finished (S2515). If "YES" is determined in the step S2508, a new node is produced (S2509), and it is determined whether the key tendency is decrease tendency or not in order to determine the reading order flag (S2510).

If "NO" is determined in the step S2510, the reading order flag for the leaf node page is set to "F" (forward order) (S2511). If "YES" is determined in the step S2510, the reading order flag for the leaf node page is set to "R" (reverse order) (S2512).

If the step S2511 or S2512 is finished, keys are moved to the new node, and a pointer of a parent node is updated (S2513). Then, the process jumps to the parent node (S2514), and returns to the step S2508. Until no node split occurs on a parent node, the steps S2508 to the step S2514 are repeated, and the process is finished (S2515).

FIGS. 21A to 21C show examples of the index process when the reading order flags are set.

FIG. 21A shows an index when keys are inserted in an order of "0, 1, 2, 3, 4, 5, 6" when the key tendency is the random tendency.

The index when the keys are inserted in an order of "0, 1, 2, 3" is an index 1102. A reading order flag 1101 is to "F" due to the random tendency. With reference to the flowchart shown in FIG. 20, a specific description will now be given of a case where a key of "4" is inserted.

In the step S2502, since the reading order flag is "F", "F" is determined, and the key is compared from the head of the node (S2503). Then, since the node presently being processed is a leaf node, "YES" is determined in the step S2505. The key insertion position is identified as the right most position in the step S2507.

Since the key storage number is five, in the step S2508, "YES" is determined, and a new node is produced (S2509). Since the key tendency is random tendency, "NO" is determined in the step S2510, and the reading order flag of the new node is set to "F" (S2511). The keys "2, 3, 4" are moved to the new node, and the pointer of a parent node is updated (S2513). In this case, there is no parent node, so a parent node is produced. Due to the random tendency, the reading order flag of the parent node is set to the forward order of "F".

The process returns to the step S2508, there is no node split in the parent node, thus, "NO" is determined in the step S2508, and the process is finished (S2514). The index for which processing has finished is an index 1103.

Similarly, when keys are inserted in an order of "5, 6", an index 1104 is brought about.

FIG. 21B shows an index when keys are inserted in an order of "0, 1, 2, 3, 4, 5, 6" when the key tendency is the increase tendency. A reading order flag 1105 is set to "F". In this case, as in FIG. 21A, the reading order of keys is the forward order. When the index process is carried out as in FIG. 21A, an index 1106 is brought about after the keys "0, 1, 2, 3" are inserted, and an index 1107 is brought about after the keys "4, 5, 6" are inserted.

FIG. 21C shows an index when keys are inserted in an order of "11, 10, 9, 8, 4, 5, 6, 5, 4, 3" when the key tendency is the decrease tendency. Since the key tendency is the decrease tendency, a reading order flag 1108 is set to the reverse order or "R".

When the index process is carried out as in FIG. 21A, the keys "11, 10, 9, 8" are inserted, and an index 1109 is brought about. Then, when the key of "7" is inserted, the node reaches the storage upper limit, thus, the node is split, and the key of "7" is inserted at the head of the new node, resulting in an index 1110. Then, when the keys of "6, 5, 4, 3" are inserted, since the keys are inserted in the reverse order, the keys "6, 5, 4" are inserted in the index 1110 without changing the position of the key of "7". Then, when the key of "3" is inserted, a node split occurs, and the key of "3" is inserted into the new node, resulting in an index 1111.

In this case, if the reading order flag is "R", the pointers to a parent node or the child nodes of a reference node are arranged in the reverse order. Thus, the keys are inserted in an order of "8, 4" on the reference node.

Moreover, when the leaf nodes and index nodes are stored in the storage system 160 such as a memory and a disk, they are stored page by page. In the indexes described in FIG. 21A to 21C, the keys are allocated to respective addresses of the pages. The reading order flag defines the order of this allocation. In an index to which the reading order flags are applied, values of keys are written in a node in the reverse order with respect to the magnitude of the value, and values of keys are read in the reverse order with respect to the stored positions in the figure in the left and right direction.

As described above, according to the sixth embodiment, if the key tendency is the decrease tendency, the reading order of keys is the reverse order, and if the key tendency is the increase tendency or the random tendency, the reading order of keys is the forward order. As a result, when the key tendency is the decrease tendency, by writing keys in the descending order, it is possible to restrain data from moving, to reduce the load on the index process and to realize a high-speed search.

The sixth embodiment of this invention has been described above.

Seventh Embodiment

A description will now be given of a seventh embodiment of this invention.

According to the first to sixth embodiments, the index process is applied to the stream data processing system. According to the seventh embodiment, the index process is applied to a database system. Any one of or a combination of the first to sixth index processes may be applied.

Figure 22:
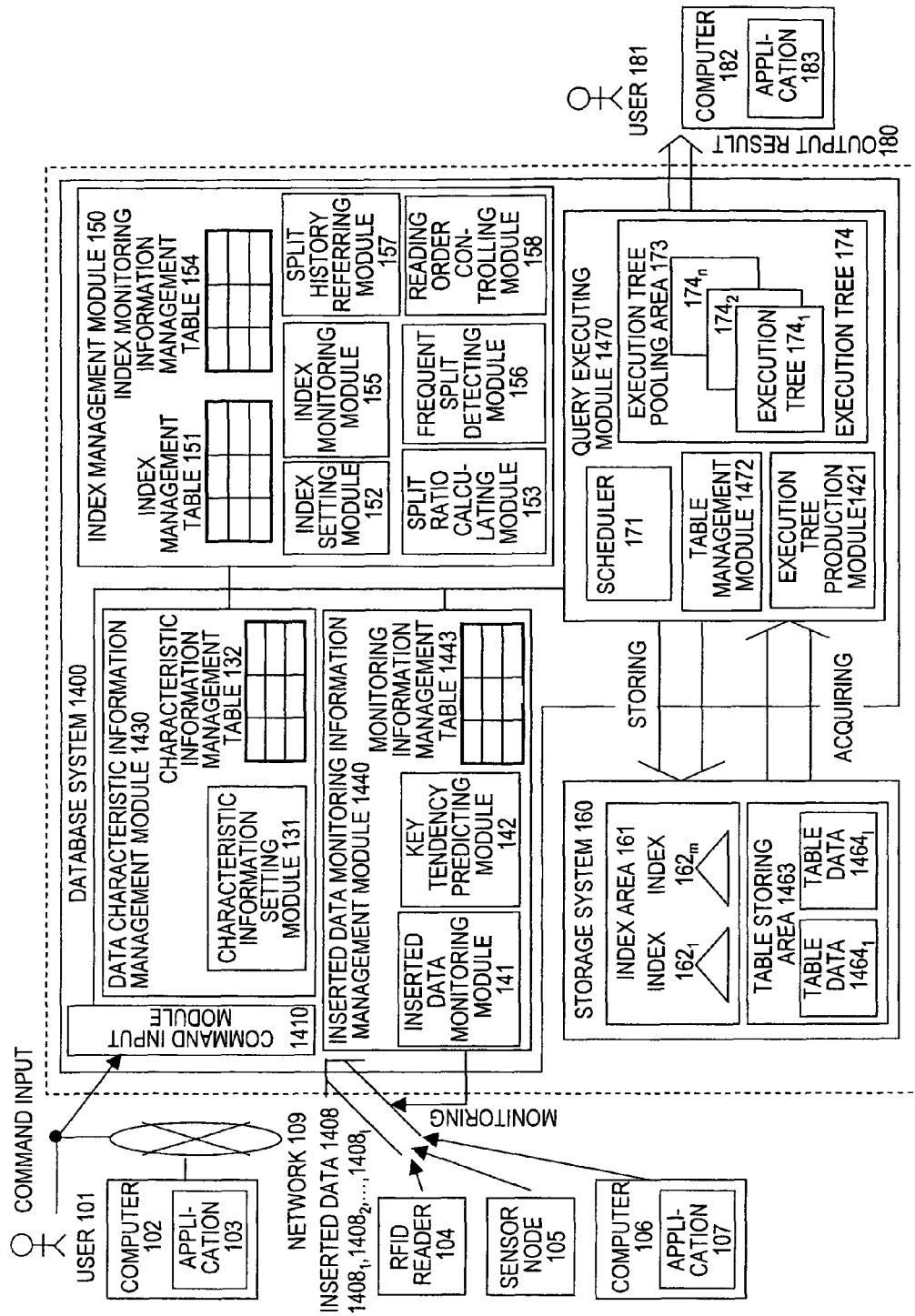
FIG. 22 is a block diagram showing a configuration of a database system according to an embodiment of this invention, and relating systems.

FIG. 22 is a block diagram showing a configuration of the database system according to the embodiment of this invention, and relating systems.

The database system 1400 stores an input inserted data 1408 in the storage system 160 as table data 1464, a command input module 1410 receives a query sentence (SQL sentence) from the computer 102, and searches the table data 1464, which is different from the first embodiment. For the other configuration, like components are denoted by like numerals as of the first embodiment and will not be further explained. A description will now be given of differences between the stream data processing system according to the first embodiment shown in FIG. 1, and the database system 1400 according to the seventh embodiment. In FIG. 22, when data is input from a data source such as the RFID reader 104, the sensor node 105, or the application 107 running on the computer 106 to the database system 1400, the input is not in a form of a tuple (record) for the stream data processing system 100, but a query (SQL sentence), and a command input module 1410 analyzes the SQL query to carry out a database process.

In the stream data processing system 100 according to the first embodiment, the query management module 120 registers a query from the user 101 or the computer 102, and sequentially executes the registered queries. On the other hand, in the database system 1400, an output result 180 is output each time a query arrives, and, thus, it is not necessary to retain the query information, so the query management module 120 as in the first embodiment is not necessary. However, the database system 1400 needs an execution tree production module 1421 in the query executing module 1470 as a module to produce an execution tree from a query.

A data characteristic information management module 1430 manages the characteristics of the inserted data 1408 in place of the stream data characteristic information management module 130 according to the first embodiment. It should be noted that the contents of the process is the same as those of the stream data characteristic management module 130 according to the first embodiment. With the stream data 108 monitored by the stream data monitoring information management module 140 being changed to the inserted data 1408, an inserted data monitoring information management module 1440 carries out the same process as that of the stream data monitoring information management module 140 according to the first embodiment.

The storage system 160, in place of the storage system 160 according to the first embodiment, stores external data of the database system 1400. In the database system 1400, the storage system 160 may be an external storage system such as a SAN storage system and a NAS, and is described as an independent system in FIG. 22. The computer may incorporate therein the storage system 160. Moreover, the database system 1400 retains data until a data discard command is issued, which is different from the stream data processing system 100. Moreover, the data structure is a table structure, so a table storing area 1463 and a table data 1464 are necessary.

The query executing module 1470 is configured by replacing the temporal storage management module 172 of the query executing module 170 according to the first embodiment by a table management module 1472, and newly adding an execution tree production module 1421. The query executing module 1470 executes a query by storing data in the storage system 160, and acquiring data from the storage system 160.

According to the seventh embodiment, in the system configuration as described above, the node split ratio of the index 162 is switched. The method of switching the node split ratio, the method of setting the key tendency, and the order of reading the index are processed in the same manner as the first to sixth embodiments.

The seventh embodiment of this invention has been described above.

This invention is not limited to the first to seventh embodiments, and may be modified in various ways within the gist thereof. Moreover, it is possible to produce an embodiment by combining the first to seventh embodiments.

For example, in the first embodiment, though the description is given with reference to the index management table 151 shown in FIG. 8, the index management table 151 shown in FIG. 23 may be used to change the node split ratio based on the leaf node position at which a key is inserted. This method can provide an index which is small in capacity, and enables high-speed processing when keys are grouped, and the respective groups have different tendencies, or the key tendency changes according to the leaf node position in the tree structure of an index. It is possible to use this method for the index process at the time of the diverging tendency and converting tendency described in the first embodiment.

A detailed description will now be given thereof.

FIG. 23 shows a configuration example of the index management table 151.

An index name column 1501, a stream data name column 1502, a column name column 1503, and a key tendency column 1504 respectively correspond to the index name column 701, the stream data name column 702, the column name column 703, and the key tendency column 704 in the index management table 151 shown in FIG. 8 according to the first embodiment.

A leaf node position column 1505 stores positions (such an nth from the left) of leaf nodes in a tree structure of an index.

A split ratio column 1506 stores node split ratios corresponding to the leaf node position column.

For example, a row 1507 represents that, for an index whose index name is "index 1", whose stream data name is "S1", and whose column name is "temperature", when the key tendency is the "increase tendency", a node is split according to "4:3" if the leaf node position is "0<=position<10". Moreover, a row 1508 represents that a node is split according to "5:2" if the leaf node position is "10<=position<90", and a row 1509 represents that a node is split according to "6:1" if the leaf node position is "90<=position<100".

In this case, the stream data processing system 100, based on the index management table 151, issues a split ratio change command to an index 162. Moreover, the leaf node position column 1505 may not be fully filled with information.

The index processing is realized such that the index management table 151 shown in FIG. 23 is used in place of the index management table 151 shown in FIG. 8 according to first embodiment, a leaf node position is identified in the step S2002 upon inserting a key in the index process shown in FIG. 9, and a node split ratio corresponding to the key tendency and the leaf node position is acquired in the step S2008.

Figure 24:
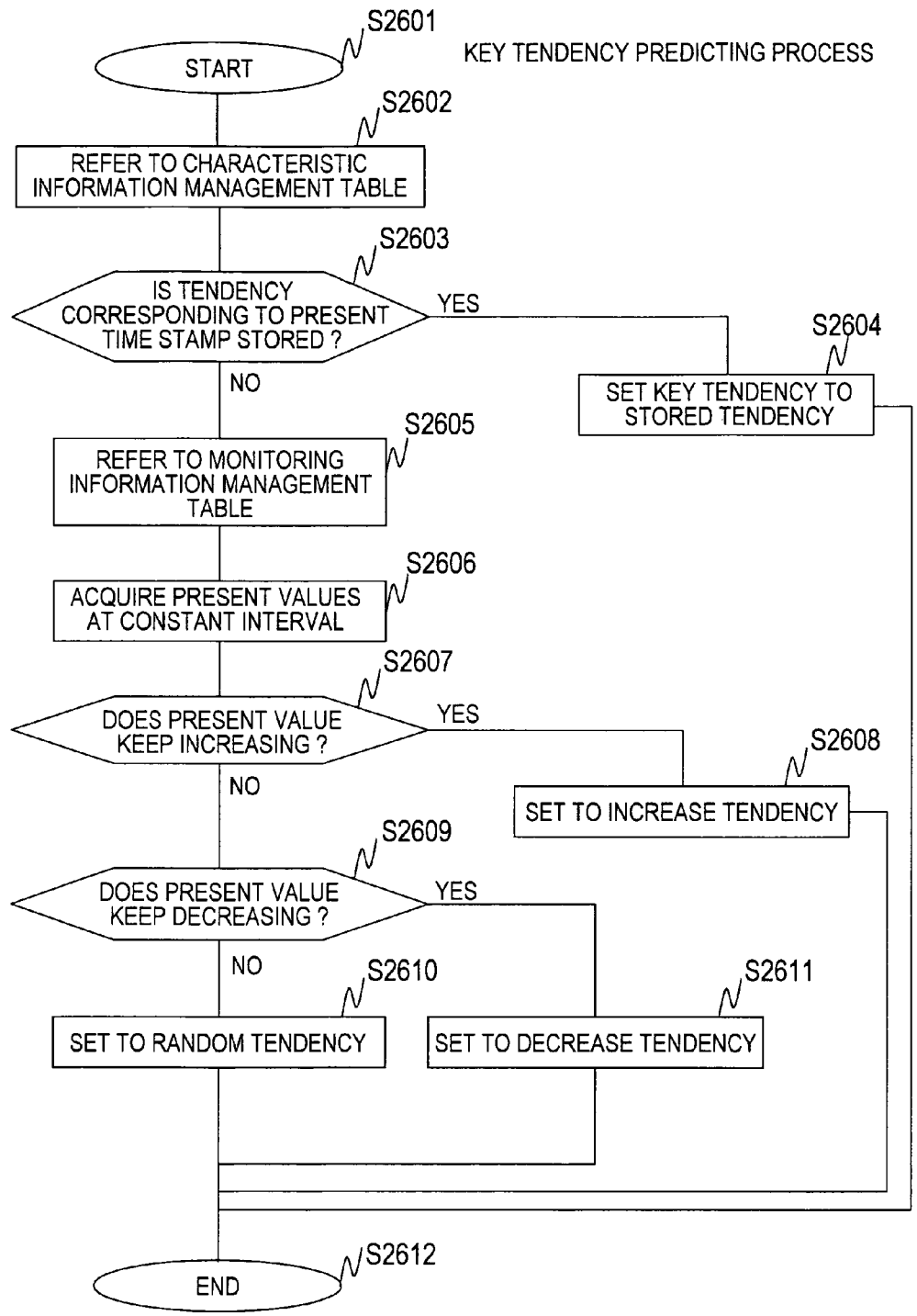
FIG. 24 is a flowchart showing other processing steps of the split ratio calculating process.

Moreover, though the example of the key tendency predicting process shown in FIG. 14 is described in the second embodiment, as a key tendency predicting process shown in FIG. 24, the key tendency may be predicted by using the present value column which stores the latest values of the monitoring information in the monitoring information management table 143.

A detailed description will now be given thereof.

FIG. 24 is a flowchart showing the key tendency predicting process.

Steps S2601, S2602, S2603, S2604, and S2612 correspond to the steps S2101, S2102, S2103, S2104, and S2112 shown in FIG. 14 according to the first embodiment, respectively.

In the step S2605, the key tendency predicting module 142 refers to the monitoring information management table 143, and acquires the values of the present value column 607 at a constant interval tracing back from the latest monitoring information.

The number or the period of the values in the present value column 607 to be acquired may be arbitrary. For example, in the present value column 607 in the monitoring information management table 143 shown in FIG. 13, three values in the present value column 607 at 10:00, 10:05, and 10:10 may be acquired.

Then, the key tendency predicting module 142 determines whether the acquired present values keep increasing or not (S2607). An arbitrary definition may be used as "keep increasing". For example, a definition that an increase is present across the entire values while the same values are not permitted, and a definition that an increase is present between the first and the last values while the intermediate values may be the same values may be used.

If the key tendency predicting module 142 determines "YES" in the step S2607, the key tendency predicting module 142 sets the key tendency to the increase tendency (S2608), and finishes the process (S2612). If the key tendency predicting module 142 determines "NO" in the step S2607, the key tendency predicting module 142 determines whether the present values acquired at the last time keep decreasing (S2609). An arbitrary definition may be used for "keep decreasing". For example, a definition that a decrease is present across the entire values while the same values are not permitted, and a definition that a decrease is present between the first and the last values while the intermediate values may be the same values may be used.

If the key tendency predicting module 142 determines "YES" in the step S2609, the key tendency predicting module 142 sets the key tendency to the decrease tendency (S2611), and finishes the process (S2612). If the key tendency predicting module 142 determines "NO" in the step S2609, the key tendency predicting module 142 sets the key tendency to the random tendency (S2610), and finishes the process.

Moreover, in the embodiments, though the description is given of the examples of the index processing in the stream data processing system 100 and the database system 1400, the index processing described in the embodiments may be carried out in systems other than the stream data processing system and the database system.

Moreover, in the embodiments, though the description is given assuming that the stream data processing system 100 and the database system 1400 are arbitrary computer systems, the processing carried out by the stream data processing system 100 and the database system 1400 may be carried out partially or totally by the storage system.

Moreover, though the description is given of the example where the sensor node 105 inputs the temperature data as the stream data 108 in the stream data processing system 100, this invention is not limited to this configuration. For example, in place of the sensor node 105, a sensor net server, which manages a number of sensor nodes, may output measured values of the sensor nodes as the stream data 108, and the stream data processing system 100 may convert the stream data 108 into an output result 180 containing significant data intelligible to the user 181, and provides the computer 182 with the resulting data. Moreover, the data input to the stream data processing system 100 may be information on a tag read by the RFID reader, and data input from the computer 106, which is an RFID middleware system centrally managing the RFID's. In addition, the data input to the stream data processing system 100 may be traffic information such as that from an ETC system, IC card information such as that from automatic ticket gates and credit cards, financial information such as information on the stock prices, and manufacturing process management information.

(Supplement)

In an index processing method according to Claim 5,
the key tendency of a key series to be inserted includes an increase tendency representing a monotonic increase or not a monotonic increase but a general increase as a whole, a decrease tendency representing a monotonic decrease or not a monotonic decrease but a general decrease as a whole, and a random tendency having no characteristic, and representing random values,
the data monitoring information acquisition step further includes the step of acquiring present value information representing a value of data to be monitored upon the monitoring information being acquired, and
the key tendency determination step sets the key tendency to the increase tendency if the present value information corresponding to the monitoring information at a constant interval keeps increasing, sets the key tendency to the decrease tendency if the present value information corresponding to the monitoring information at a constant interval keeps decreasing, and sets the key tendency to the random tendency in cases other than the cases.

Moreover, in the index processing method according to claim 5,
the key tendency of a key series to be inserted includes an increase tendency representing a monotonic increase or not a monotonic increase but a general increase as a whole, a decrease tendency representing a monotonic decrease or not a monotonic decrease but a general decrease as a whole, and a random tendency having no characteristic, and representing random values,
the data monitoring information acquisition step further includes the step of acquiring an increment counter which compares the data to be monitored and the data preceding the data to be monitored with each other, and indicates whether the data to be monitored has increased or not, and a decrement counter which compares the data to be monitored and the data preceding the data to be monitored with each other, and indicates whether the data to be monitored has decreased or not, and
the key tendency determination step sets the key tendency to the increase tendency if the ratio of the increment counter to the decrement counter exceeds a predetermined increment counter threshold, sets the key tendency to the decrease tendency if the ratio of the decrement counter to the increment counter exceeds a decrease counter threshold, and sets the key tendency to a random tendency otherwise.

The index processing method according to claim 14, further includes the step of determining a node split ratio which represents a key distribution ratio upon splitting a node of the index,
in which the frequent node split detection step, upon detecting a frequent node split, resets the node split ratio to a predetermine value.

Moreover, in an index processing method for splitting a node if the key storage upper limit is exceeded when an index key is inserted into the node of an index,
the index includes reading order flags respectively indicating whether an order to assign the keys to respective addresses of a page is forward or reverse.

In the index processing method,
the step upon a key being inserted in the index includes the steps of:
determining whether the reading order flag of a node of the index indicates the forward order or reverse order;
upon the reading order flag indicating the forward order, comparing the magnitude of the keys from the head of the node;
upon the reading order flag indicating the reverse order, comparing the magnitude of the keys from the tail of the node;
determining whether the node of the index is a leaf node or not;
upon the index node being not a leaf node, jumping to a child node to repeat the previous steps until reaching a leaf node; and
upon the index node being not a leaf node, identifying a position indicating a key insertion position in the node.

Moreover, the index processing method includes,
a key tendency determination step of determining a key tendency representing a characteristic of a key series to be inserted in the index node,
in which a step upon a key being inserted in the index includes the steps of:
determining whether a node split occurs in the node;
producing new nodes;
determining whether the key tendency of the key series to be inserted is a monotonic decrease or not a monotonic decrease but a general decrease as a whole or not;

upon the key tendency being the decrease tendency, setting the reading order flag to the reverse order;

upon the key tendency not being the decrease tendency, setting the reading order flag to the forward order;

moving keys to new nodes, and updating pointers of a parent node;

jumping to the parent node, and determining whether a node split occurs in the parent node or not; and repeating the previous steps until a node split does not occur in the parent node.

As described above, the index processing according to the invention can process an index of stream data with a small index capacity at a high speed. Especially, this index processing can be applied to financial applications, traffic information systems, traceability systems, sensor monitoring systems, computer system management, and the like which handle an enormous amount of stream data to be processed in real time.

While the present invention has been described in detail and pictorially in the accompanying drawings, the present invention is not limited to such detail but covers various obvious modifications and equivalent arrangements, which fall within the purview of the appended claims.

What is claimed is:

1. An index processing method for inserting a key into an index of a tree structure, the key indicating a respective value for a specific item of data newly input into a computer, the tree structure including a plurality of keys respectively indicating recorded values for the specific item of data successively input and nodes for storing the keys, the index being used for searching for the item of data associated with the key, the index processing method comprising:

identifying a node in the tree structure to which the key is to be inserted;

determining whether a quantity of keys stored in the identified node exceeds a predetermined key storage upper limit; and upon determining that the quantity of keys stored in the identified node exceeds the key storage upper limit, splitting the identified node into a first node and a second node according to a node split ratio that is controlled using a ratio changing process that changes the node split ratio, wherein the ratio changing process comprises determining a key tendency representing a characteristic of value change for the specific item of data, and determining the node split ratio based on the key tendency.

2. The index processing method according to claim 1, further comprising changing the node split ratio by acquiring the key tendency; and acquiring the node split ratio corresponding to the key tendency.

3. The index processing method according to claim 1, further comprising changing the node split ratio by acquiring time information; and determining the key tendency according to the time information; and acquiring the key tendency.

4. The index processing method according to claim 1, further comprising monitoring the item of data, and acquiring data monitoring information, wherein determining the key tendency comprises calculating a predicted value of the key tendency based on the data monitoring information, and determining the predicted value as the key tendency.

5. The index processing method according to claim 4, wherein the data monitoring information retains a change of value of the item of data as a key series, and wherein determining the key tendency comprises, upon the key series increasing as a whole, determining that the key tendency is an increase tendency, upon the key series decreasing as a whole, determining that the key tendency is a decrease tendency, and, upon the key series not being either increasing or decreasing, determining that the key tendency is a random tendency.

6. The index processing method according to claim 5, further comprising storing the keys stored in the identified node in the first node and the second node based on the node split ratio, wherein determining the node split ratio comprises, upon the key tendency being the increase tendency or the decrease tendency, setting a split ratio for differentiating a quantity of the keys to be stored in the first node and a quantity of the keys to be stored in the second node, and wherein the split ratio, upon the key tendency being the increase tendency, is set so that the quantity of the keys to be stored in the first node is larger than upon the key tendency being the decrease tendency.

7. The index processing method according to claim 1, wherein determining the node split ratio comprises acquiring the key tendency, a node position representing a position of the identified node in the tree structure, and a split ratio according to the key tendency and the node position, and setting the acquired split ratio as the node split ratio.

8. The index processing method according to claim 5, wherein determining the node split ratio comprises, upon the key tendency being the increase tendency or the decrease tendency, determining the node split ratio based on the key tendency, the key storage upper limit, and a key insertion position representing a position within the node for the key indicating the respective value for a specific item of data newly input.

9. The index processing method according to claim 1, further comprising monitoring the index, and acquiring a state of the index as index monitoring information, wherein:

the index monitoring information includes time information; and a split ratio set to a node of the index and the node split ratio determination step sets a split ratio of the index corresponding to the time information of the index monitoring information.

10. The index processing method according to claim 9, wherein determining the node split ratio comprises:

narrowing down the node split ratio information based on time conditions relating to the time information;

upon an external attribute condition relating to attribute information stored in an external recording medium being present, further narrowing down; and upon a narrowed down result being present, setting the node split ratio to a highest frequency.

11. An index processing method for splitting a node of an index if a predetermined key storage upper limit is exceeded when a key is inserted in the node of the index, wherein the index includes a reading order flag indicating whether an order to assign the keys to respective addresses of a page is forward order or reverse order, comprising:

determining whether the reading order flag of a node of the index indicates the forward order or reverse order;

upon the reading order flag indicating the forward order, comparing the magnitude of the keys from a head of the node;

upon the reading order flag indicating the reverse order, comparing the magnitude of the keys from a tail of the node;

determining whether the node of the index is a leaf node;

upon the node being not a leaf node, jumping to a child node to repeat the previous steps until reaching a leaf node;

upon the node being a leaf node, identifying a position indicating a key insertion position in the node; and determining a key tendency representing a characteristic of a key series to be inserted in the index.

12. The index processing method according to claim 11, further comprising:
upon the key being inserted in the index:
determining whether a node split occurs in the node;
determining whether the key tendency of the key series to be inserted is a monotonic decrease or not a monotonic decrease but a general decrease as a whole;
upon the key tendency being the decrease tendency, setting the reading order flag to the reverse order;
upon the key tendency not being the decrease tendency, setting the reading order flag to the forward order;
moving keys to new nodes, and updating pointers of a parent node;
jumping to the parent node, and determining whether a node split occurs in the parent node; and
repeating the previous steps until a node split does not occur in the parent node.

13. The index processing method according to claim 1, further comprising:
monitoring the index, and acquiring a state of the index as index monitoring information;
acquiring a quantity of splits in a node of the index based on the data monitoring information and the index monitoring information; and
upon the quantity of splits in the node exceeding a predetermined threshold in the index, determining that splitting of the node has occurred frequently.

14. The index processing method according to claim 13, wherein determining that splitting of the node has occurred frequently comprises:
calculating a predicted quantity of splits in the node within a predetermined period based on the data monitoring information;
acquiring a quantity of splits in the node which have occurred in the index within the predetermined period based on the index monitoring information; and
determining that, upon a ratio of the quantity of the splits of the node which have occurred within the predetermined period to the predicted quantity of splits exceeding a predetermined value, splitting of the node has frequently occurred.

15. The index processing method according to claim 13, further comprising the steps of, upon determination of the frequent split of the node, acquiring again the data monitoring information,
wherein the key tendency determination step calculates a predicted value of the key tendency based on the data monitoring information acquired again, and determines the predicted value as the key tendency.

16. A machine-readable medium embodying a program for causing a computer to execute index processing for inserting a key into an index of a tree structure, the key indicating a respective value for a specific item of data newly input into a computer, the tree structure including a plurality of keys respectively indicating recorded values for the specific item of data successively input and nodes for storing the keys, the index being used for searching for the item of data associated with the key, wherein the program causes the computer to execute a procedure comprising:

identifying a node in the tree structure to which the key is to be inserted;
determining whether the number of keys stored in the identified node exceeds a predetermined key storage upper limit or not; and
upon determining that the quantity of keys stored in the identified node exceeds the key storage upper limit, splitting the identified node into a first node and a second node according to a node split ratio that is controlled using a ratio changing process that changes the node split ratio,
wherein the ratio changing process comprises determining a key tendency representing a characteristic of value change for the specific item of data, and determining the node split ratio based on the key tendency.

17. A computer system provided with a processor, a storage system, and an interface, including a data area set in the storage system for storing data input via the interface, and an index area set in the storage system for storing an index of a tree structure, the processor inserting a key corresponding to respective value for a specific item of data newly input into the index, the tree structure including a plurality of keys respectively indicating recorded values for the specific item of data successively input and nodes for storing the keys, the index being used for searching for the item of data associated with the key, the computer system comprising:
an insertion position identifying unit for identifying a node in the tree structure to which the key is to be inserted
a node split determination unit for determining whether a quantity of keys stored in the identified node exceeds a predetermined key storage upper limit; and
a node splitting unit for, upon a determination that the quantity of keys stored in the identified node exceeds the key storage upper limit, splitting the identified node into a first node and a second node according to a node split ratio that is controlled using a ratio changing process that changes the node split ratio,
wherein the ratio changing process comprises determining a key tendency representing a characteristic of value change for the specific item of data, and determining the node split ratio based on the key tendency.

18. The computer system according to claim 17, further comprising a data monitoring unit for monitoring the item of data to acquire data monitoring information, and wherein the key tendency determination unit calculates a predicted value of the key tendency based on the data monitoring information, and determines the predicted value as the key tendency.

19. The computer system according to claim 17, further comprising:
an index monitoring unit for monitoring the index area set, and acquiring a state of the index as index monitoring information;
a split number acquiring unit for acquiring a quantity of splits in a node of the index based on the data monitoring information and the index monitoring information; and
a frequent split detecting unit for, upon the quantity of splits in the node exceeding a predetermined threshold in the index, determining that splitting of the node has occurred frequently.

* * * * *